(12) United States Patent
Jiang et al.

(10) Patent No.: US 8,396,318 B2
(45) Date of Patent: Mar. 12, 2013

(54) INFORMATION PROCESSING APPARATUS, INFORMATION PROCESSING METHOD, AND PROGRAM

(75) Inventors: Shan Jiang, Tokyo (JP); Ken Tamayama, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 12/547,181

(22) Filed: Aug. 25, 2009

(65) Prior Publication Data

US 2010/0054590 A1 Mar. 4, 2010

(30) Foreign Application Priority Data

Aug. 27, 2008 (JP) .............................. P2008-218011

(51) Int. Cl.
*G06K 9/40* (2006.01)
(52) U.S. Cl. ........ 382/265; 382/260; 382/255; 382/275; 382/264; 382/167; 382/195
(58) Field of Classification Search ........................ None
See application file for complete search history.

(56) References Cited

U.S. PATENT DOCUMENTS

| | | | | |
|---|---|---|---|---|
| 4,947,323 A | * | 8/1990 | Smith ........................... | 382/132 |
| 5,550,935 A | * | 8/1996 | Erdem et al. .................. | 382/260 |
| 6,245,016 B1 | * | 6/2001 | Daft et al. ..................... | 600/443 |
| 7,519,231 B2 | * | 4/2009 | Li et al. ........................ | 382/264 |
| 8,204,330 B2 | * | 6/2012 | Albu et al. ..................... | 382/255 |
| 8,208,746 B2 | * | 6/2012 | Albu et al. ..................... | 382/255 |
| 2007/0009169 A1 | * | 1/2007 | Bhattacharjya ............... | 382/255 |
| 2008/0240607 A1 | * | 10/2008 | Sun et al. ...................... | 382/275 |
| 2010/0054590 A1 | * | 3/2010 | Jiang et al. .................... | 382/167 |
| 2010/0329582 A1 | * | 12/2010 | Albu et al. ..................... | 382/255 |
| 2011/0150353 A1 | * | 6/2011 | Watanabe et al. ............. | 382/255 |
| 2011/0158541 A1 | * | 6/2011 | Watanabe ..................... | 382/195 |

OTHER PUBLICATIONS

Lu Yuan et al., "Image Deblurring with Blurred/Noisy Image Pairs", ACM Transactions on Graphics, vol. 26, No. 3, pp. 1-1-1-10 (2007).

* cited by examiner

*Primary Examiner* — Anand Bhatnagar
*Assistant Examiner* — Tsung-Yin Tsai
(74) *Attorney, Agent, or Firm* — Finnegan, Henderson, Farabow, Garrett & Dunner, L.L.P.

(57) ABSTRACT

An information processing apparatus includes: a first generating unit which generates, based on feature points detected on a cepstrum from an input image, a point-spread function that represents the degree of blurring generated in the input image; a second generating unit which generates a structure that represents an image obtained by reducing the input image with a size based on the point-spread function and enlarging this with the size, based on the point-spread function; and an updating unit which executes an updating process to update at least either the point-spread function or the structure such that the point-spread function and the structure approximate to a true value, with the updating unit repeatedly executing the updating process to set, of a structure component and a texture component making up the updated structure, the structure component as a new updated structure, and set the updated point-spread function as a new updated target.

16 Claims, 14 Drawing Sheets

- SEVERAL PIXELS STRONGLY REACT TO AN INDEPENDENT BLOCK
- ZERO AT A FLAT PORTION
- WEAKLY REACT TO A RIDGE
⇩
SEARCH FOR THE MAXIMUM VALUE AFTER THIS FILTERING TAKE OUT ONE PEAK INCLUDING THE MAXIMUM VALUE

DISCARD HALF DUE TO ROTATIONAL SYMMETRY
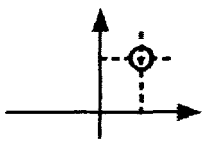
OBTAIN THE CENTER OF GRAVITY

IF THE MINIMUM SQUARE ADJACENT TO THE FOUND SPOTS INCLUDES A PORTION EXCEEDING A THRESHOLD, THIS DEFAULT ESTIMATION IS DISMISSED.

GENERATE SPOTS WITH ORIGIN SYMMETRY
→ REDUCE THE COORDINATE VALUE TO HALF

MEASURE DISTANCE FROM EACH GRATING POINT TO THE STRAIGHT LINE

EXAMPLE OF FALSE PIXELS

EXAMPLE OF support MASK

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program, and more specifically, it relates to an information processing apparatus, an information processing method, and a program, whereby blurring due to shaking at the time of imaging, so-called defocusing due to focal length shift, or the like can be corrected.

2. Description of the Related Art

Hitherto, there has been correction technology wherein shaking blurring or defocusing (hereinafter, also simply referred to as blurring) occurring in an imaged image is corrected.

For example, with the Richardson-Lucy method proposed by L. B. Lucy and William Hardley Richardson, when solving an inverse problem using a spectrum that falls into the zero point on the frequency axis of a point spread function (PSF (Point Spread Function)), amplification of noise, occurrence of ringing, or the like appears at the zero point.

Also, in the case that a point spread function has not been obtained accurately, amplification of noise, occurrence of ringing, or the like frequently appears at the zero point.

Therefore, according to introduction of a gain map, there has been the residual deconvolution technology whereby ringing can be suppressed in the case that a point spread function can be obtained accurately (e.g., see Image Deblurring with Blurred/Noisy Image Pairs (Lu Yuan)).

SUMMARY OF THE INVENTION

However, with the residual deconvolution technology according to the related art, in the case that a point spread function includes an error, restoration of the structure components (structure) and residual (residual portions) of an image are not executed well, and accordingly, ringing frequently occurs.

The present invention has been made in light of such a situation, and the object of the present invention is to enable blurring due to shaking or focal length shift to be corrected by suppressing ringing and so forth.

According to an embodiment of the present invention, there are provided an information processing apparatus, or program that causes a computer to serve as an information processing apparatus, the information processing apparatus including: a first generating unit configured to generate, based on feature points detected on a cepstrum from an input image, a point spread function that represents the degree of blurring generated in the input image; a second generating unit configured to generate a structure that represents an image obtained by reducing the input image with a size based on the point spread function and enlarging the input image with the size, based on the point spread function; and an updating unit configured to execute an updating process to update at least either the point spread function or the structure such that the point spread function and the structure approximate to a true value, with the updating unit repeatedly executing the updating process to set, of a structure component and a texture component making up the structure after updating by the updating process, the structure component as a new structure to be updated by the updating process, and set the point spread function after updating by the updating process as a new target to be updated by the updating process.

The updating unit may repeatedly execute the updating process to set the point spread function and the structure as a target to be updated.

The updating unit may repeatedly execute the updating process to set the point spread function and the structure as a target to be updated alternately.

The updating unit may update at least one of the point spread function and the structure by the landweber method or the Richard-Lucy method.

The updating unit may separate the structure after updating by the updating process into the structure component and the texture component based on a filter threshold used for separating the structure after updating by the updating process into the structure component and the texture component to set the structure component after separation as a new structure to be updated by the updating process.

The updating unit may set the filter threshold to some extent that the structure is updated to separate the structure component and the texture component.

The updating unit may end the updating process in the case that a total variation has been changed from increase to decrease, or in the case that the absolute value of a difference obtained by subtracting calculation results by convolution calculation between the point spread function and the texture from the input image is equal to or smaller than a predetermined threshold.

The first generating unit may divide the input image into a plurality of blocks to generate the point spread function for the divided blocks each, and the second generating unit may generate a structure from a block obtained by reducing and then enlarging the block.

The first generating unit may generate the point spread function corresponding to a predetermined block of a plurality of blocks making up the input image, and the updating unit may update the point spread function generated by the first generating unit repeatedly.

The updating unit may set the point spread function finally obtained by updating the point spread function repeatedly as a point spread function corresponding to a block different from the predetermined block of a plurality of blocks, and may use a point spread function corresponding to a block different from the predetermined block to update the structure regarding each block different the predetermined block repeatedly.

The information processing apparatus further may include: a convolution calculating unit configured to execute convolution calculation between a point spread function and a structure finally obtained according to the updating process by the updating unit; a subtracting unit configured to subtract a convolution calculation result obtained by the convolution calculation from the input image; a restoring unit configured to restore the texture of the input image based on the subtraction result by the subtracting unit; and a restored image generating unit configured to generate a restored image from which blurring generated in the input image based on a structure finally obtained and the texture restored.

According to an embodiment of the present invention, there is provided an information processing method for an information processing apparatus configured to correct an input image, the information processing apparatus including a first generating unit, a second generating unit, and an updating unit, the method including the steps of: using the first generating unit to generate a point spread function that represents the degree of blurring generated in the input image, based on feature points detected on a cepstrum from an input image; using the second generating unit to generate a structure that represents an image obtained by reducing the input image with a size based on the point spread function, and enlarging the input image with the size, based on the point spread function; and using the updating unit to execute an updating process to update at least either the point spread function or the structure such that the point spread function and the structure approximate to a true value, with the updating unit repeatedly executing the updating process to set, of a structure component and a texture component making up the structure after updating by the updating process, the structure component as a new structure to be updated by the updating process, and setting the point spread function after updating by the updating process as a new target to be updated by the updating process.

With the above configurations, based on feature points detected on a cepstrum from an input image, a point spread function that represents the degree of blurring generated in the input image is generated, a structure that represents an image obtained by reducing the input image with a size based on the point spread function, and enlarging this with the size is generated based on the point spread function, an updating process to update at least either the point spread function or the structure is executed such that the point spread function and the structure approximate to a true value, the updating process is repeatedly executed by setting, of a structure component and a texture component making up the structure after updating by the updating process, the structure component as a new structure to be updated by the updating process, and setting the point spread function after updating by the updating process as a new target to be updated by the updating process.

According to an embodiment of the present invention, there are provided an information processing apparatus, or program that causes a computer to serve as an information processing apparatus, the information processing apparatus including: a generating unit configured to generate a plurality of cepstrums based on the spectrum of an input image; a detecting unit configured to detect a cepstrum having the maximum value, and a cepstrum around the cepstrum having the maximum value as spots, of the generated plurality of cepstrums; an estimating unit configured to estimate the point spread function of the input image based on the detected spots; and a determining unit configured to determine whether or not there is a cepstrum having a value equal to or greater than a predetermined threshold within a range adjacent to the detected spots.

The estimating unit may approximate the point spread function estimated to a point spread function in accordance with a Gaussian distribution in the case that determination is made by the determining unit that there is a cepstrum having a value equal to or greater than a predetermined threshold within a range adjacent to the detected spots.

The generating unit may generate a plurality of cepstrums based on one of a spectrum corresponding to one of an R component, a G component, and a B component of pixels that make up the input image, a spectrum corresponding to a Y component that represents weight sum according to the R component, the G component, and the B component, and a spectrum corresponding to a R+G+B component obtained by adding the R component, the G component, and the B component.

The information processing apparatus may further include an updating unit configured to use the structure of the input image to update the point spread function estimated by the estimating unit.

The information processing apparatus may further include a limiting information generating unit configured to generate support limiting information that limits the range of the point spread function to be updated by the updating unit, based on the point spread function estimated by the estimating unit, and the updating unit may update the point spread function estimated by the estimating unit, based on the support limiting information.

The updating unit may use one of an R component, a G component, and a B component of pixels that make up the structure, a Y component that represents weight sum according to the R component, the G component, and the B component, and a R+G+B component obtained by adding the R component, the G component, and the B component to update the point spread function estimated by the estimating unit.

According to an embodiment of the present invention, there is provided an information processing method for an information process apparatus configured to estimate a point spread function that represents blurring generated in the input image, the information processing apparatus including a detecting unit, an estimating unit, and a determining unit, the method including the steps of: using the detecting unit to generate a plurality of cepstrums based on the spectrum of an input image; using the estimating unit to detect, of the generated plurality of cepstrums, a cepstrum having the maximum value, and a cepstrum around the cepstrum having the maximum value as spots; using the estimating unit to estimate a point spread function that represents blurring generated in the input image based on the detected spots; and using the determining unit to determine whether or not there is a cepstrum having a value equal to or greater than a predetermined threshold within a range adjacent to the detected spots.

With the above configuration, multiple cepstrums are generated based on the spectrum of an input image, and of the generated multiple cepstrums, a cepstrum having the maximum value, and a cepstrum around the cepstrum having the maximum value are detected as spots, a point spread function that represents blurring generated in the input image is estimated based on the detected spots, and determination is made whether or not there is a cepstrum having a value equal to or greater than a predetermined threshold within a range adjacent to the detected spots.

According to the above configurations, blurring due to shaking and focal length shift can be corrected.

DESCRIPTION OF THE PREFERRED EMBODIMENTS

Figure 1:
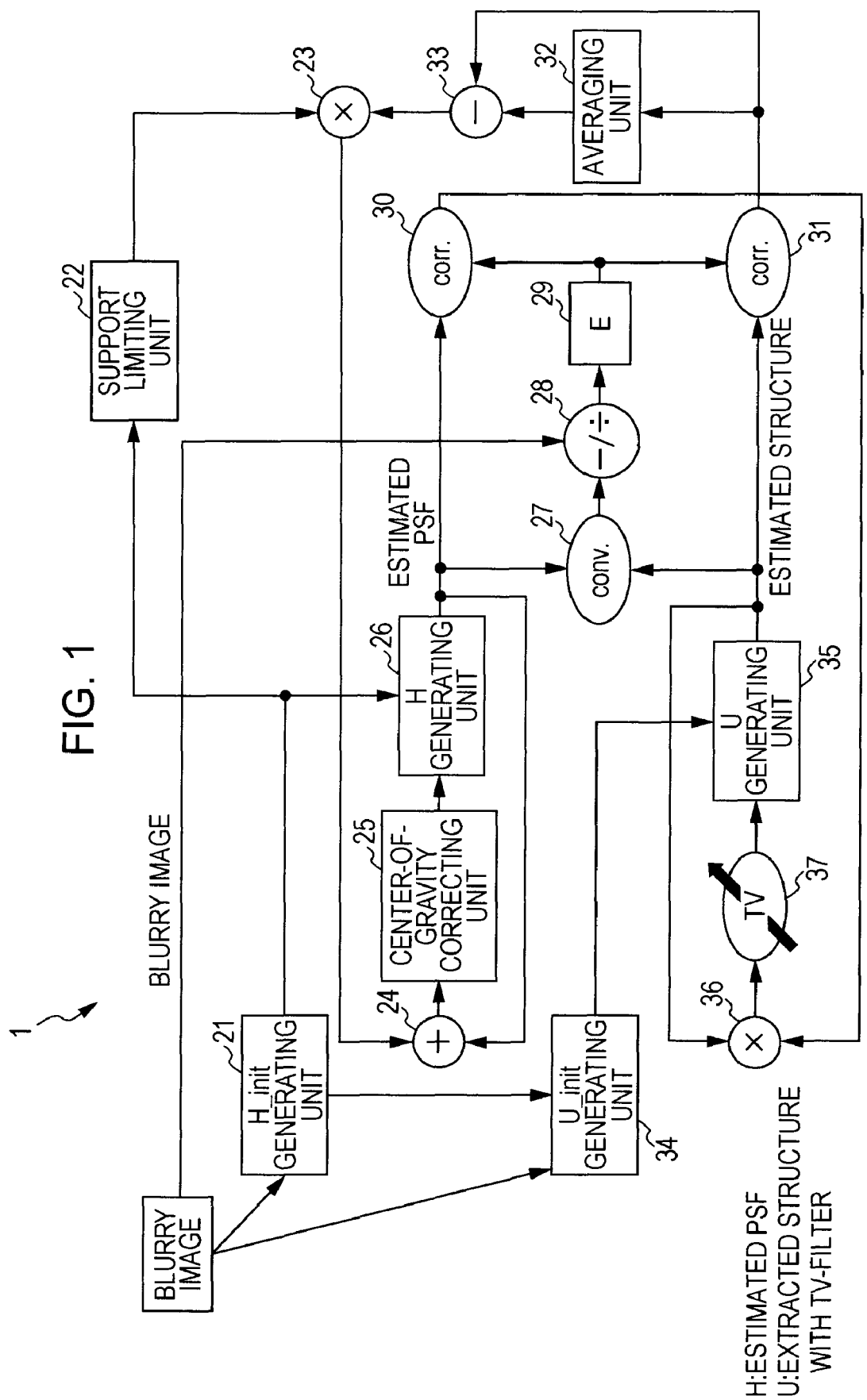
FIG. 1 is a block diagram illustrating a first configuration example of an information processing apparatus to which an embodiment of the present invention has been applied.
Figure 2:
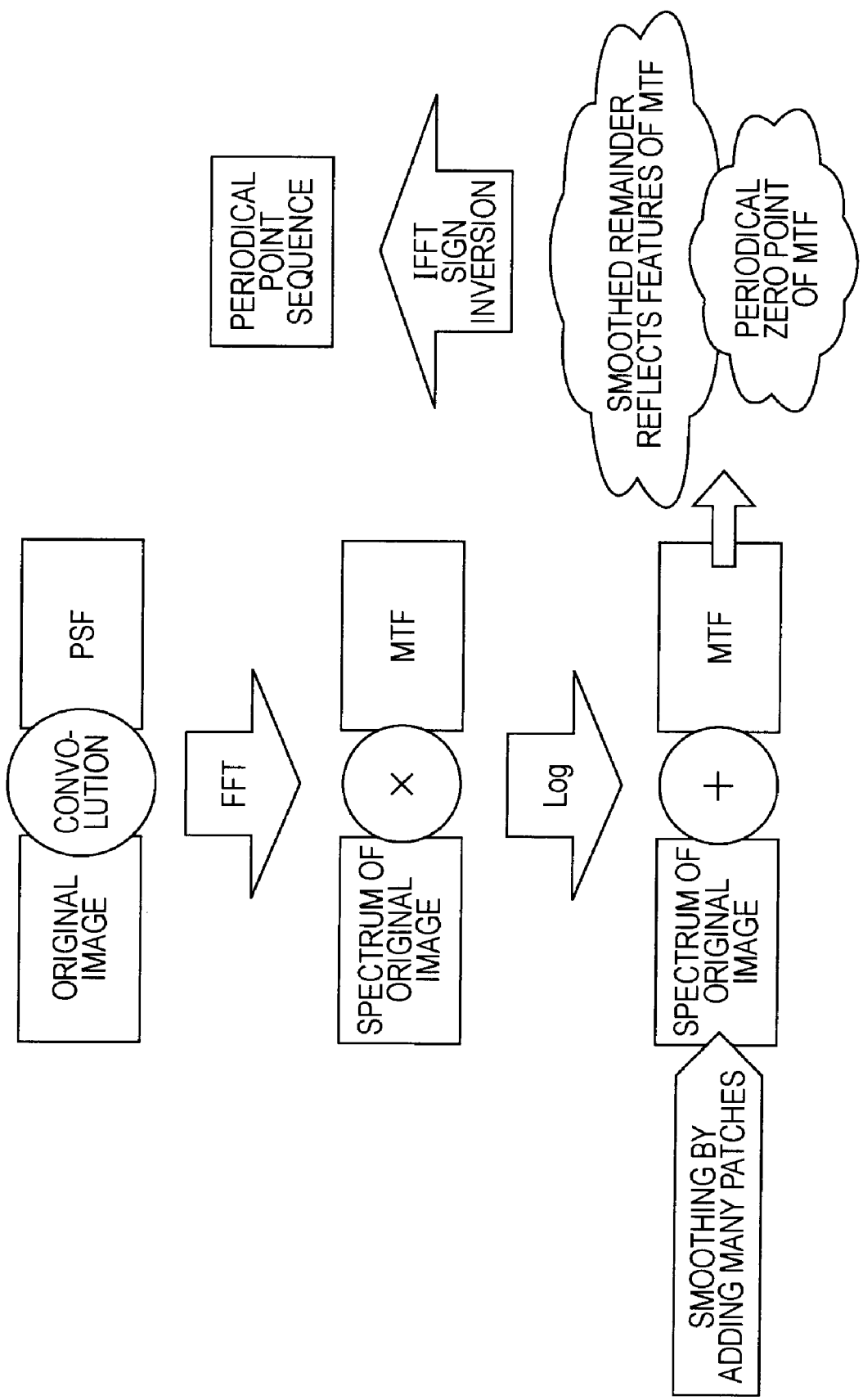
FIG. 2 is a diagram describing the overview of the estimating method of a default estimating PSF.

The present embodiment will be described below with reference to the drawings. FIG. 1 illustrates a configuration example of an information processing apparatus 1 serving as a first embodiment of the present invention.

A blurry image where blurring has occurred due to shaking at the time of imaging, which is an image compressed by JPEG (Joint Photographic Experts Group) compression, is input to the information processing apparatus 1. The information processing apparatus 1 divides an input blurry image into multiple blocks g, and for each block executes default estimation regarding a point spread function h that represents (the direction and length of) blurring generated at the block g, and a structure f that represents a great amplitude component such as a flat portion or edge or the like of the block g.

Subsequently, the information processing apparatus 1 repeatedly updates the point spread function h and the structure f subjected to default estimation for each block such that the point spread function h and the structure f approximate to a true point spread function and a true structure respectively.

Note that, hereinafter, the point spread function h when executing updating by k times will be referred to as a point spread function $h^k$, and the structure f when executing updating by k times will be referred to as a structure $f^k$. Also, in the case that the point spread function $h^k$ for each block does not have to be distinguished, this will simply be referred to as a point spread function $H^k$. Also, in the case that the structure $f^k$ for each block does not have to be distinguished, this will simply be referred to as a blurry image G.

The information processing apparatus 1 is configured of an H_init generating unit 21, a support limiting unit 22, a multiplying unit 23, an adding unit 24, a center-of-gravity correcting (Center of gravity revision) unit 25, an H generating unit 26, a conv unit 27, a processing unit 28, a residual generating unit 29, a corr unit 30, a corr unit 31, an averaging (average) unit 32, a subtraction unit 33, a U_init generating unit 34, a U generating unit 35, a multiplying unit 36, and a total variation (Total Variation) filter 37.

The blurry image G is input to the H_init generating unit 21. The H_init generating unit 21 detects feature points on a cepstrum from the luminance value (Y component) of a pixel making up the input blurry image to execute the linear estimation of a PSF, and supplies the default estimated PSF obtained according to the linear estimation thereof to the support liming unit 22, and the H generating unit 26 as the default value H_init ($=H^0$) of a point spread function H.

Note that the H_init generating unit 21 detects a feature point on a cepstrum from an R component, a G component, a B component, and an R+G+B component obtained by adding the R component, the G component, and the B component in addition to the Y component of a pixel making up the input blurry image G, whereby the straight line estimation of a PSF can be executed.

The support limiting unit 22 generates support limiting information used for updating only the vicinity of the default value H_init (=the default estimated PSF) from the H_init generating unit 21 as a region to be updated, and supplies this to the multiplying unit 23. Now, the support limiting information will be referred to as mask information with only the vicinity of the default estimated PSF as a region to be updated, and with a region other than the region to be updated as zero fixedly.

The multiplying unit 23 extracts, of the subtraction results $U^k o(G-H^k OU^k)-\text{mean}(H^k)$ from the subtracting unit 33, the one corresponding to the subtraction result around the default estimated PSF, and supplies this to the adding unit 24. That is to say, for example, the multiplying unit 23 multiplies the support limiting information from the support limiting unit 22, and the corresponding subtraction result $U^k o(G-H^k OU^k)-\text{mean}(H^k)$ from the subtracting unit 33, extracts only the one corresponding to the subtraction result around the PSF, and supplies this to the adding unit 24. Note that o represents correlation calculation, and 0 represents convolution calculation. Also, mean($H^k$) represents the average value of the point spread function $H^k$.

The adding unit 24 multiplies the value $U^k o(G-H^k OU^k)$ of the values $U^k o(G-H^k OU^k)-\text{mean}(H^k)$ from the multiplying unit 23 by an undetermined multiplier $\lambda$. Subsequently, the adding unit 24 adds the point spread function $H^k$ from the H generating unit 26 to a value $\lambda U^k o(G-H^k OU^k)-\text{mean}(H^k)$ obtained as a result thereof, applies Lagrange's method for undetermined multipliers to the value $H^k+\lambda U^k o(G-H^k OU^k)-\text{mean}(H^k)$ obtained as a result thereof, thereby calculating a value a as the solution of the undetermined multiplier $\lambda$.

The adding unit 24 substitutes the value a calculated by the Lagrange's method for undetermined multipliers for the value $H^k+\lambda U^k o(G-H^k OU^k)-\text{mean}(H^k)$, and supplies a value $H^k+a U^k o(G-H^k OU^k)-\text{mean}(H^k)$ obtained as a result thereof to the center-of-gravity correcting unit 25. Thus, $H^k+a U^k o (G-H^k OU^k)-\text{mean}(H^k)=H^k+\Delta H^k$ obtained for multiple blocks each is supplied to the center-of-gravity unit 25.

The center-of-gravity unit 25 moves the gravity of the point spread function $H^k+\Delta H^k$ (where $\Delta H^k$ is the updated amount) to the center of the screen (the gravity of the default value H_init of the point spread function) by bilinear interpolation, and supplies the point spread function $H^k+\Delta H^k$ of which the gravity has been moved, to the H generating unit 26. Note that the details thereof will be described later with reference to FIG. 8.

The H generating unit 26 supplies the default value H_init from the H_init generating unit 21 to the adding unit 24, conv unit 27, and corr unit 30 as a point spread function $H^0$. Also, the H generating unit 26 supplies the point spread function $H^k+\Delta H^k$ from the center-of-gravity unit 25 to the adding unit 24, conv unit 27, and corr unit 30 as a point spread function $H^{k+1}$ after updating.

In the case that a point spread function $H^{k-1}+\Delta H^{k-1}$ obtained by updating the point spread function $H^{k-1}$ has been supplied from the center-of-gravity unit 25, the H generating unit 26 similarly supplies the point spread function $H^{k-1}+\Delta H^{k-1}$ from the center-of-gravity unit 25 to the adding unit 24, conv unit 27, and corr unit 30 as a point spread function $H^k$ after updating.

The conv unit 27 executes convolution calculation between the point spread function $H^k$ from the H generating unit 26, and the structure $U^k$ from the U generating unit 35, and supplies a calculation result $H^k O U^k$ thereof to the processing unit 28.

The processing unit 28 subtracts from the input blurry image G the calculation result $H^k O U^k$ from the conv unit 27, and supplies a subtraction result $G - H^k O U^k$ thereof to the residual generating unit 29.

The residual generating unit 29 supplies the subtraction result $G - H^k O U^k$ from the processing unit 28 to the corr unit 30 and the corr unit 31 as a residual $E^k$.

The corr unit 30 executes correlation calculation between the residual $E^k$ from the residual generating unit 29 and the structure $H^k$ from the H generating unit 26, and supplies a calculation result $H^k o(G - H^k O U^k)$ thereof to the multiplying unit 36.

The corr unit 31 executes correlation calculation between the residual $E^k$ from the residual generating unit 29 and the structure $U^k$ from the U generating unit 35, and supplies a calculation result $U^k o(G - H^k O U^k)$ thereof to the subtracting unit 33.

The point spread function $H^k$ is supplied from the H generating unit 26 to the averaging unit 32 via the processing unit 28, residual generating unit 29, and corr unit 31. The averaging unit 32 calculates the average value mean($H^k$) of the point spread function $H^k$ from the corr unit 31, and supplies this to the subtracting unit 33. The subtracting unit 33 subtracts the mean($H^k$) from the averaging unit 32 from the calculation result $U^k o(G - H^k O U^k)$ supplied from the corr unit 31, and supplies a subtraction result $U^k o(G - H^k O U^k) - \text{mean}(H^k)$ obtained as a result thereof to the multiplying unit 23.

The U_init generating unit 34 uses the default value H_init (=default estimated PSF) generated by the H_init generating unit 21 to reduce the input blurry image G (block g) with the default estimated PSF to return the convoluted PSF to one point, thereby generating a reduced image that is an image where the blurring of the blurry image G has been removed (decreased). Also, the U_init generating unit 34 enlarges the reduced image with the default estimated PSF size to generate an image that is an image blurred by enlargement of which the blurring has been removed, and sets this as the default value U_init of the structure U, and supplies this to the U generating unit 35. Note that the details of the method for setting the default value U_init by the U_init generating unit 34 will be described with reference to later-described FIG. 7.

The U generating unit 35 supplies the structure $U^{k+1}$ from the total variation filter 37 to the corr unit 27, corr unit 31, and multiplying unit 36. Also, the structure $U^k$ is supplied to the U generating unit 35 from the total variation filter 37. The U generating unit 35 supplies the structure $U^k$ from the total variation filter 37 to the conv unit 27, corr unit 31, and multiplying unit 36.

The multiplying unit 36 multiplies the calculation result $H^k O(G - H^k O U^k)$ from the corr unit 30 by the structure $U^k$ from the U generating unit 35, and supplies a multiplication result $U^k \{H^k O(G - H^k O U^k)\}$ thereof to the total variation filter 37 as a structure after updating.

The total variation filter 37 separates the multiplication result $U^k \{H^k O(G - H^k O U^k)\}$ from the multiplying unit 36 into a structure component and a texture component, and supplies the structure component obtained by separation to the U generating unit 35 as the structure $U^{k+1}$ serving as the next target to be updated.

As described above, the conv unit 27 through corr unit 31, U generating unit 35, total variation filter 37, and so forth use the default value H_init (=$H^0$) of the point spread function H generated by the H_init generating unit 21 to execute updating of the structure $U^0$ by the Richardson-Lucy method.

Also, in the case that the point spread function $H^{k-1}$ has been updated, the conv unit 27 through corr unit 31, U generating unit 35, total variation filter 37, and so forth use the newest point spread function $H^k$ obtained by updating to execute updating of the structure $U^k$ by the Richardson-Lucy method.

With the Richardson-Lucy method, amplified noise and generated ringing are eliminated by separation between a structure component and a texture component by the total variation filter 37 regarding the structure $U^{k+1}$ obtained by updating of the structure $U^k$, whereby the noise and ringing can be suppressed greatly.

Here, the structure component represents a large amplitude component such as a flat portion, edge, or the like of an image, i.e., a component serving as a skeleton. Also, the texture component represents a small amplitude component such as a fine pattern or the like. Further, the total variation filter 37 is described in detail in "Structure-Texture Image Decomposition Modeling, Algorithms, and Parameter Selection (Jean-Francois Aujol)".

Note that a filter threshold that indicates the boundary between the structure component and the texture component is set to the total variation filter 37 as one of the parameters, and the parameter thereof is adjusted, whereby more many details can be included in the structure component (structure) to be output. However, with the initial stage of a repetitive updating process (described later in FIG. 10) wherein the structure $U^k$, and a later-described point spread function $H^k$ are updated alternately repeatedly, the point spread function $H^k$ has not been updated sufficiently, and accordingly, the point spread function $H^k$ may include many errors in some cases.

Therefore, upon using the point spread function $H^k$ including many errors to execute updating of the structure $U^k$, ringing or the like corresponding to the errors included in the point spread function $H^k$ occurs as to a structure $U^{k+1}$ to be obtained by updating.

Similarly, with regard to the structure $U^k$ as well, ringing or the like corresponding to the errors included in the point spread function $H^k$ occurs. This also causes an adverse effect on the point spread function $H^k$ to be updated using the structure $U^k$ where ringing or the like has occurred.

Therefore, while the point spread function $H^k$ has not been sufficiently updated, the filter threshold to be set to the total variation filter 37 is set high, thereby eliminating ringing and noise strongly, and preventing the structure U to be updated from deteriorating due to occurrence of ringing or the like.

Upon the point spread function $H^k$ being updated to some extent, and approximating to a truer point spread function, the filter threshold to be set to the total variation filter 37 is set low, and accordingly, restoration of details is executed by the true point spread function $H^k$. That is to say, while the point spread function $H^k$ has not been sufficiently updated, the filter threshold is set high such that, of pixels making up the structure $U^k$ output from the total variation filter 37, total variation that represents the luminance difference absolute value sum between adjacent pixels becomes small.

Also, upon the point spread function $H^k$ being updated to some extent, and approximating to a truer point spread function, the filter threshold is set low such that the total variation of the structure $U^k$ output from the total variation filter 37 does not become smaller any more.

Thus, with the total variation filter 37, the structure $U^k$ is smoothed while remaining an edge include in the structure $U^k$, whereby ringing and noise included in the structure U can be eliminated.

Note that, with the first embodiment, let us say that the total variation filter 37 is configured to eliminate amplified noise and generated ringing regarding the structure $U^k$ by separation between a structure component and a texture component by the total variation filter 37 in a state wherein the filter threshold is set low sufficiently regardless of the degree of updating of the point spread function $H^k$.

The H generating unit 26 through residual generating unit 29, corr unit 31, U generating unit 35, and so forth use the default value U_init of the structure $U^k$ to execute updating of the point spread function $H^k$ by the landweber method. Also, in the case that the structure $U^{k-1}$ has been updated, the H generating unit 26 through residual generating unit 29, corr unit 31, U generating unit 35, and so forth use the newest structure $U^k$ obtained by updating to execute updating of the point spread function $H^k$ by the landweber method.

Description will be made below regarding a process wherein a structure $f^k$ (the newest structure obtained by updating) of a predetermined block g of multiple blocks making up a blurry image is used as the structure $U^k$, and the point spread function $h^k$ of the predetermined block g is updated as updating of the point spread function $H^k$ by the landweber method.

Now, if we say that the structure $f^k$ at present is f, and the point spread function $h^k$ at present is h, a cost function is provided by the following Expression (1).

$$e^2 = \|g - h*f\|^2 \qquad (1)$$

Note that, in Expression (1), $\|\cdot\|$ represents a norm, and * represents multiplication.

In the case that the structure f at present is fixed, in order to minimize $e^2$ of Expression (1), as shown in the following Expression (2), Expression (1) is differentiated partially with variable h (point spread function h), thereby obtaining a descent direction.

$$\nabla e^2 = \frac{\partial e^2}{\partial h} (-2) fo(g - h \otimes f) \qquad (2)$$

Upon searching the point spread function h at present along the descent direction obtained by Expression (2), there is the minimum value of Expression (2). Upon advancing the point spread function h at present by step size λ in the descent direction obtained by Expression (2) as shown in the following Expression (3), the updated point spread function h can be obtained.

$$h^{k+1} = h^k \lambda f^k o(g - h^k \otimes f^k) \qquad (3)$$

Note that, in Expression (2) and Expression (3), the circle represents a correlation operator, and a symbol made up of an x-mark in a circle represents a convolution calculation.

Also, in Expression (3), the point spread function $h^{k+1}$ represents the point spread function after updating, and the point spread function $h^k$ represents the point spread function h (point spread function before updating) at present. Further, the structure $f^k$ represents the structure f at present.

However, the structure $h^{k+1}$ is enforced to satisfy $\Sigma_{i=1}^{i} h(i) = 1$ with the point spread function $h^{k+1}(i)$ of each of the multiple blocks making up a blurry image, and accordingly, the point spread function $h^{k+1}$ is normalized by a loop formed by the H generating unit 26 through residual generating unit 29, corr unit 31, U generating unit 35, and so forth. Therefore, when the updated amount $\Delta h^k$ of the point spread function $h^k$ becomes the same sign as the point spread function $h^k$, as a result of the normalization, the point spread function $h^{k+1}$ returns to the value before updating unintentionally.

Upon adding the constraint of $\Sigma_{i=1}^{i} h(i) = 1$ to Expression (3) to apply Lagrange's method for undetermined multipliers, the following Expression (4) is derived.

$$h^{k+1} = h^k + \lambda f^k o(g - h^k \otimes f^k) - \text{mean}(h) \qquad (4)$$

Note that, in Expression (4), mean(h) denotes the average value of $h^k$. The mean(h) is subtracted by the subtracting unit 33.

Also, according to a rounding error, the center of gravity sometimes deviates from the center of the screen while updating the point spread function $h^k$, and accordingly, inaccurate residual e is obtained, and this causes an adverse effect on updating (restoration) of the structure $f^k$. Therefore, the center-of-gravity correcting unit 25 executes parallel movement by bilinear interpolation at or below one pixel (pix) such that the point spread function $h^k + \Delta h^k (= h^{k+1})$ and the center of gravity come to the center of the screen.

The information processing apparatus 1 calculates, as described above, the structure $U^k$ after updating as a structure that represents a block from which blurring has been removed, making up a blurry image. Subsequently, the information processing apparatus 1 obtains an original image from which blurring has been removed by making up each of the calculated structures $U^k$ so as to become one image.

Next, description will be made regarding the overview of the estimating method for the default estimated PSF that the H_init generating unit 21 executes.

A blurry image can be modeled by convolution between a blurring-free original image (the original image corresponding to the blurry image) and a PSF. The spectrum of a straight line PSF has features wherein the length of blurring falls into the zero point periodically, and according to the convolution between the original image and a PSF, with the spectrum of a blurry image as well, the length of blurring falls into the zero point periodically.

The interval and direction where the length of blurring falls into the zero point are obtained, whereby the length and direction of the straight line blurring of a PSF can be approximated. Therefore, the blurry image is subjected to FFT (Fast Fourier Transform) to calculate the spectrum of the blurry image, and the logarithm of the calculated spectrum is obtained, thereby transforming into the sum between the spectrum of the original image and the spectrum of the PSF (MTF).

The information which has to be used here is the MTF alone, and accordingly, many patches are added and averaged regarding the spectrum of the blurry image, whereby the features of the spectrum of the original image are lost, and only the features of the MTF can be represented.

Figure 3:
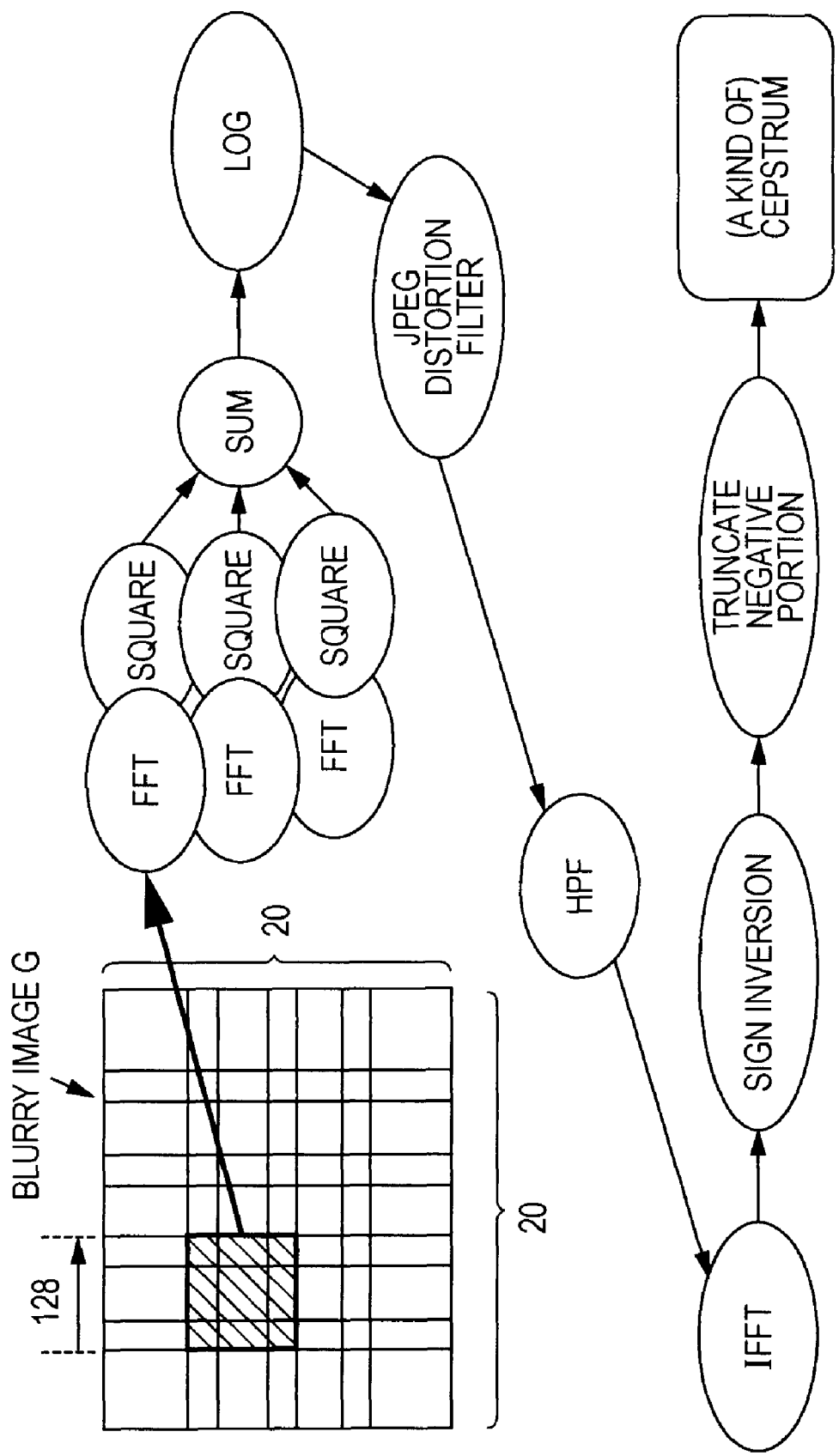
FIG. 3 is a diagram describing a generating method for generating a cepstrum regarding a blurry image.

Next, a specific estimating method used for estimating a default estimated PSF will be described with reference to FIG. 3 through FIG. 6. FIG. 3 illustrates a generating method used for generating a cepstrum regarding a blurry image.

The H_init generating unit 21 divides a blurry image to be input into multiple blocks, executes FFT (Fast Fourier Transform) for each divided block to calculate the spectrum corresponding to each block.

That is to say, for example, the H_init generating unit 21 subjects one of a Y component, a R component, a G component, and a B component, which are pixels making up a block obtained by dividing a blurry image, and a R+G+B component to FFT to calculate the corresponding spectrum.

Also, the H_init generating unit 21 obtains a logarithm regarding the sum of squares of the spectrum corresponding to each block, and removes distortion by a JPEG removal filter used for removing distortion generated at the time of JPEG compression. This prevents distortion generated at the time of JPEG compression from influencing spectrum precision.

Further, the H_init generating unit 21 executes a filtering process by an HPF (high pass filter) as to the logarithm log $\Sigma|gs|^2$ of the sum of squares of the spectrum gs corresponding to each block g after distortion removal by the JPEG removal filter to emphasize periodical falling due to blurring, thereby decreasing smooth change due to blurring.

The H_init generating unit 21 subjects a residual component subtracted with moving average, i.e., the logarithm log $\Sigma|gs|^2$ of the sum of squares of the spectrum after the filtering process by the HPF to IFFT (Inverse Fast Fourier Transform) to generate a kind of cepstrum.

More specifically, the H_init generating unit 21 inverts a positive/negative sign with the logarithm log $\Sigma|gs|^2$ of the sum of squares of the spectrum after the filtering process by the HPF. Subsequently, the H_init generating unit 21 discards a portion including a negative sign of the log $\Sigma|gs|^2$ of which the positive/negative sign has been inverted, and generates a kind of cepstrum based on only a portion including a positive sign.

Subsequently, the H_init generating unit 21 calculates the maximum value of luminescent spots regarding the generated cepstrum. That is to say, the H_init generating unit 21 calculates a cepstrum including the maximum value of the generated cepstrums as the maximum value of the luminescent spots.

Figure 4A:
FIGS. 4A through 4C are diagrams describing a calculating method for calculating the maximum value of luminescent spots as to a cepstrum.
Figure 4B:
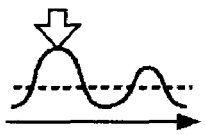
Figure 4C:
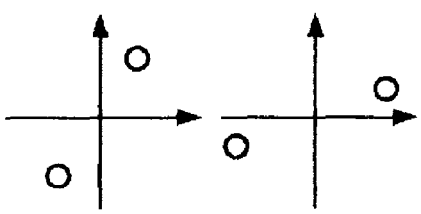

Next, FIGS. 4A through 4C illustrate a calculation method used for calculating the maximum value of luminescent spots regarding the generated cepstrum. The H_init generating unit 21 executes, as shown in FIG. 4A, subjects the generated cepstrum to a filtering process by a spot filter which compares adjacent pixels and strongly reacts with a block of multiple pixels having great luminance.

Also, as shown in FIG. 4B, the H_init generating unit 21 takes out one peak including the maximum value from the cepstrum following the filtering process by the spot filter shown in FIG. 4A.

Further, the H_init generating unit 21 determines a spot position, as shown in FIG. 4C. Note that the spot position represents the center-of-gravity position of a spot made up of multiple cepstrums making one peak including the maximum value.

Figure 5:
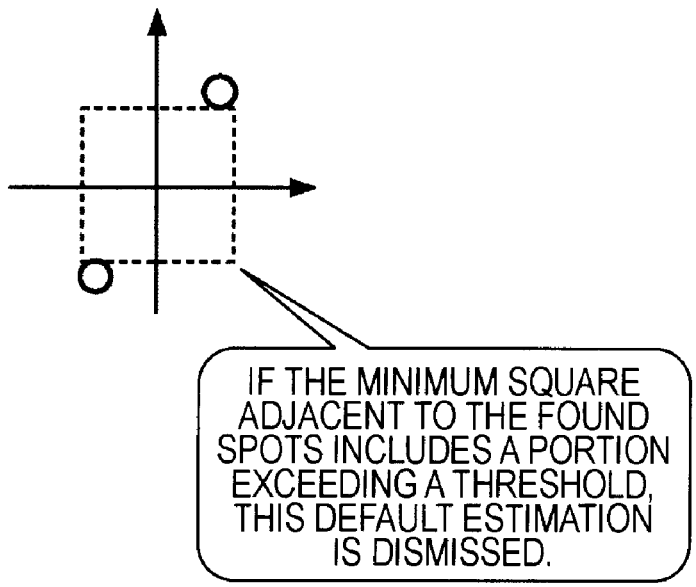
FIG. 5 is a diagram describing a determining method for determining whether or not the estimation of a default estimated PSF has succeeded.

Next, FIG. 5 describes a determining method used for determining whether or not estimation of a default estimated PSF has succeeded. Note that the estimating method for the default estimated PSF will be described with reference to later-described FIG. 6.

Luminescent spots are in origin symmetry, and accordingly, there is another feature point at an origin symmetry position. That is to say, as feature points there are two spots that are symmetric as to the origin.

In the case that there is a portion that exceeds a threshold within the minimum square range adjacent to these two spots, i.e., in the case that there is a cepstrum having a value that exceeds a threshold within the minimum square range, the H_init generating unit 21 determines that the default estimation of the default estimated PSF has failed.

In this case, the H_init generating unit 21 approximates the default estimated PSF subjected to default estimation to a PSF wherein the distribution of blurring follows a Gaussian distribution (normal distribution), and sets the PSF obtained as a result thereof as the default H_init.

Also, in the case that there is no portion that exceeds a threshold within the minimum square range adjacent to the two spots, i.e., in the case that there is no cepstrum having a value that exceeds a threshold within the minimum square range, the H_init generating unit 21 determines that the default estimation of the default estimated PSF has succeeded, and sets the default estimated PSF as the default value H_init.

Figure 6:
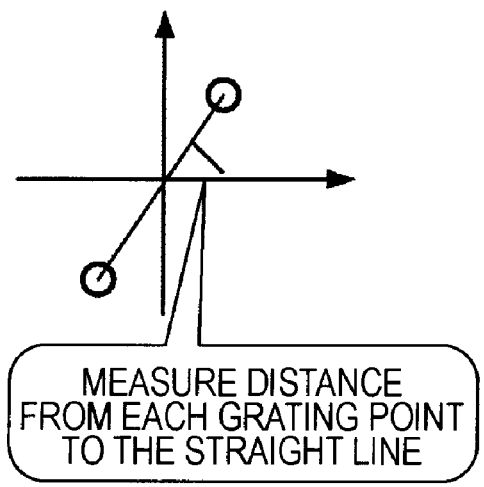
FIG. 6 is a diagram describing a generating method for generating a default estimated PSF.
Figure 6:
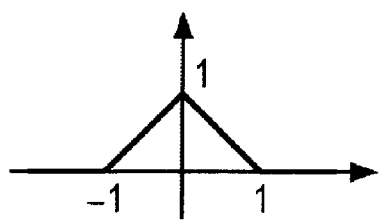

Next, FIG. 6 illustrates an estimating method used for estimating (generating) the default estimated PSF based on the two spots. In the case that there is no portion that exceeds a threshold within the minimum square range adjacent to the two spots, the H_init generating unit 21 generates, as shown in FIG. 6, a straight line that connects the spot positions with origin symmetry as a default estimated PSF, and sets this as the default value H_init.

Figure 7:
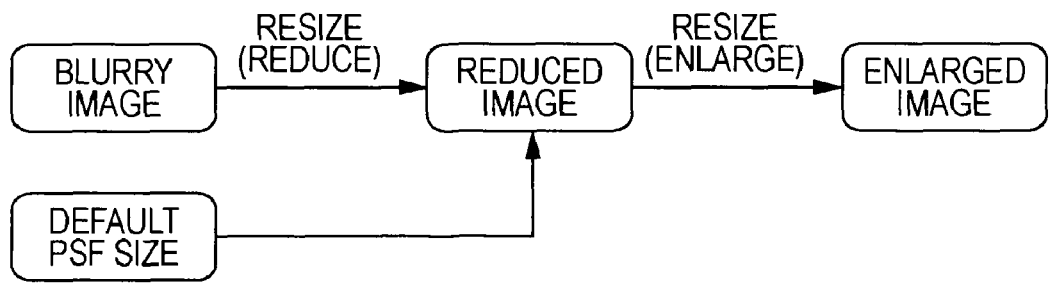
FIG. 7 is a diagram describing a generating method of the default value U_init of a structure U.

Next, description will be made regarding a generating method used for generating the default value U_init of the structure $U^k$ that the U_init generating unit 34 executes, with reference to FIG. 7. The U_init generating unit 34 reduces a blurry image to be input with the size of the default estimated PSF to generate a reduced image, and enlarges the generated reduced image with the size of the default estimated PSF to generate an enlarged image. Subsequently, the U_init generating unit 34 separates the generated enlarged image into a structure component and a texture component, and supplies the structure component obtained by separation to the U generating unit 35 as the default value U_init of the structure U.

That is to say, for example, the U_init generating unit 34 reduces a block making up an input blurry image with the same reduction size as a reduction size wherein the default estimated PSF of the block is reduced to one point, supplied from the H_init generating unit 21, thereby generating a reduced block wherein blurring generated in the block has been removed (decreased).

Subsequently, the U_init generating unit 34 enlarges the generated reduced block with the same enlargement size as an enlargement size wherein the default estimated PSF reduced to one point is enlarged to the original default estimated PSF, thereby generating an enlargement block wherein defocusing due to enlargement has occurred, but blurring has not occurred. The U_init generating unit 34 supplies the generated enlargement block to the U generating unit 35 as the default value U_init (structure $U^0$).

Figure 8:
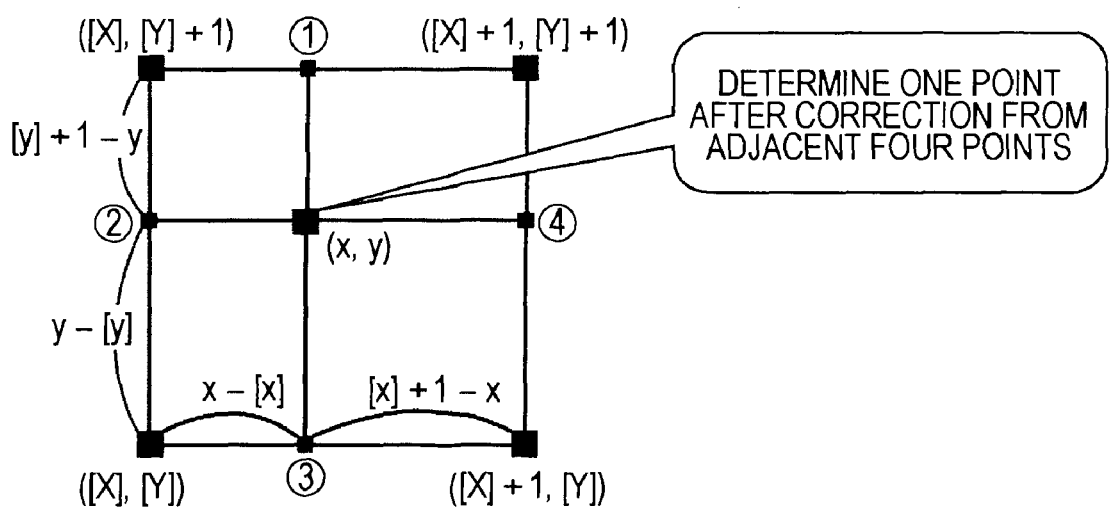
FIG. 8 is a diagram illustrating an interpolation method by bilinear interpolation.

Next, description will be made regarding a correcting method used for correcting the center of gravity that the center-of-gravity correcting unit 25 executes, with reference to FIG. 8. FIG. 8 illustrates an interpolation method by bilinear interpolation.

As described above, there is a possibility that while the H generating unit 26 through residual generating unit 29, corr unit 31, U generating unit 35, and so forth are updating the structure $H^k$, the center of gravity deviates from the center of the screen due to rounding errors, and accordingly, as shown in FIG. 8, the center-of-gravity correcting unit 25 executes parallel movement by bilinear interpolation such that the center of gravity of the point spread function $H^k + \Delta H^k$ comes to the center of the screen.

Figure 9A:
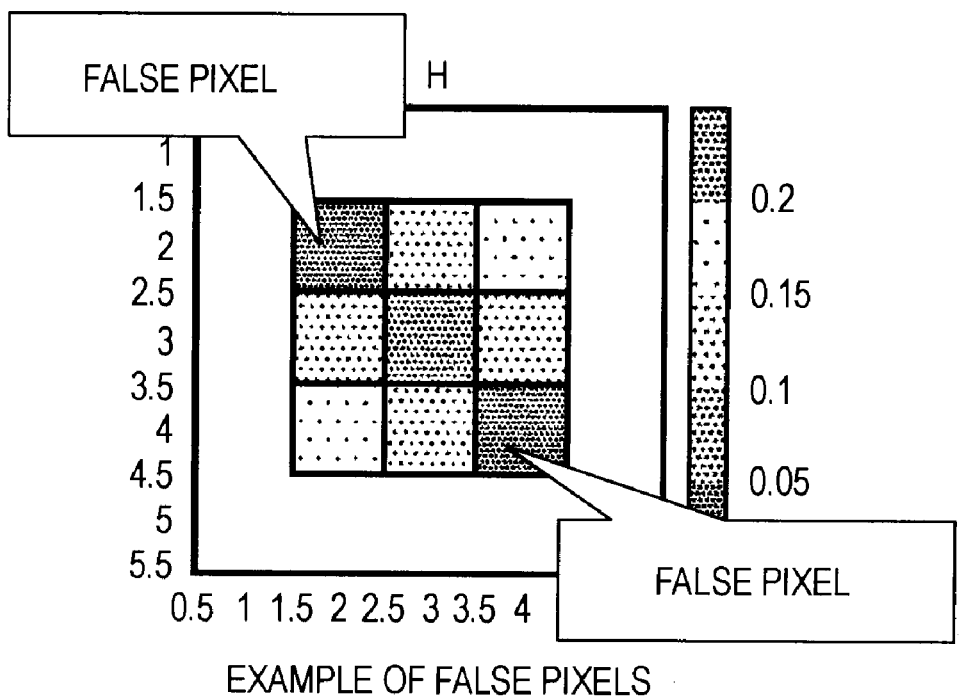
FIGS. 9A and 9B are diagrams describing a support limiting process executed by a support limiting unit.
Figure 9B:
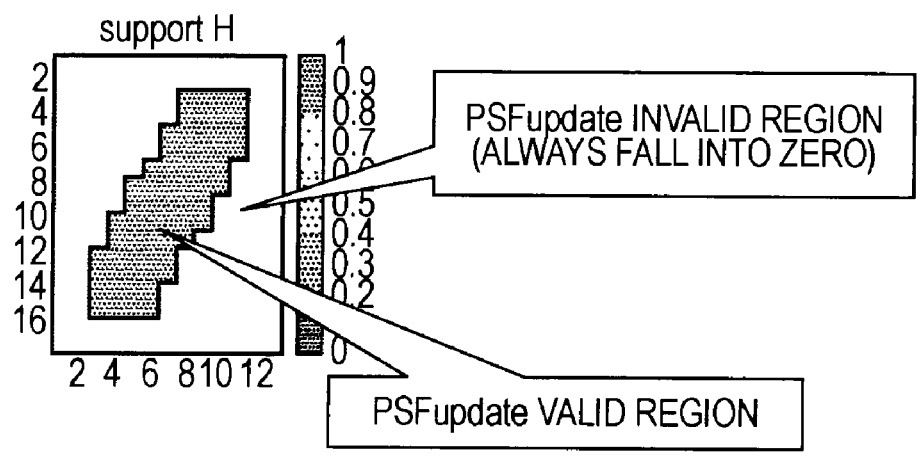

Next, description will be made regarding a support limiting process that the support limiting unit 22 executes, with reference to FIGS. 9A and 9B. When the H generating unit 26 through residual generating unit 29, corr unit 31, U generating unit 35, and so forth update the point spread function $H^k$, the flexibility of the updated amount of $\Delta H$ is high, and as shown in FIG. 9A, false pixels wherein blurring that the point spread function $H^k+\Delta H^k$ after updating represents has not been reflected accurately appear at a portion apart from the true PSF (point spread function). Therefore, as shown in FIG. 9B, the support limiting unit 22 allows only the vicinity of the default estimated PSF to be updated, and masks a region other than the vicinity of the default estimated PSF even if there is a pixel at the updated amount $\Delta H^k$, thereby applying support limiting so as to update only the vicinity of the default estimated PSF.

Incidentally, with the updating loop of the point spread function $H^k$, the updated amount $\Delta U^k$ of the structure $U^k$ is gradually reduced, and upon being reduced to some extent, residual $E^k=G-H^k*(U^k+\Delta U^k)$ is saturated (the residual E has hardly changed), and updating of the point spread function $H^k$ is stopped. Therefore, the filter threshold set to the total variation filter 37 is adjusted, thereby lowering (reducing) the residual $E^k$ purposely, which becomes a trigger to resume updating of the point spread function $H^k$.

Also, with the total variation filter 73, in the case that the final output has been done, the filter threshold is reduced (decreased in order), whereby the lack of details due to structure output can be overcome.

As the information of the structure $U^k$ used at the time of updating the point spread function $H^k$, in addition to the luminance Y (Y component that represents the sum of the multiplication results obtained by weighting as to each of a R component, a G component, and a B component), the sum of R, G, and B 3 channels (the sum of a R component, a G component, and a B component) can be used. The difference as to the case of updating only with the luminance Y is in that great feedback similar to the channel G can be obtained even as to a blurry image including an edge where blurring is reflected on the channels R and B alone. Also, as the information of the structure $U^k$ used at the time of updating the point spread function $H^k$, a R component, a G component, and a B component can be used.

Next, a repetitive updating process that the information processing apparatus 1 executes will be described with reference to the flowchart in FIG. 10. Note that, with the repetitive updating process, an algorithm is employed wherein the point spread function $H^k$ and the structure $U^k$ are updated alternately based on the mutual default values without updating the point spread function $H^k$ and the structure $U^k$ separately.

In step S31 and step S32, default estimation regarding the default value H_init and the default value U_init, and initializing of each parameter, a global variable, and so forth are executed.

Specifically, for example, in step S31, the H_init generating unit 21 detects feature points on a cepstrum from an input blurry image G, executes straight line estimation of a PSF, sets the default estimated PSF obtained from the straight line estimation thereof as the default value H_init of the point spread function H, and supplies this to the support limiting unit 22 and the H generating unit 26.

In step S32, the U_init generating unit 34 uses the default value H_init (=default estimated PSF) set by the H_init generating unit 21 to reduce the input blurry image with the size of the default estimated PSF, and return the convoluted PSF to one point, thereby generating a reduced original image that is an image wherein the blurring of the blurry image has been removed.

Also, the U_init generating unit 34 enlarges the reduced original image with the size of the default estimated PSF to generate an image that has been an image blurred due to interpolation, and has been corrected regarding the blurring thereof, sets this as the default value U_init of the structure $U^k$, and supplies this to the U generating unit 35.

Specifically, for example, the U_init generating unit 34 reduces a block making up an input blurry image with the same reduction size as a reduction size wherein the default estimated PSF of the block is reduced to one point, supplied from the H_init generating unit 21, thereby generating a reduced block wherein blurring generated in the block has been removed (decreased).

Subsequently, the U_init generating unit 34 enlarges the generated reduced block with the same enlargement size as an enlargement size wherein the default estimated PSF reduced to one point is enlarged to the original default estimated PSF, thereby generating an enlargement block wherein defocusing due to enlargement has occurred, but blurring has not occurred.

The U_init generating unit 34 supplies the generated enlargement block to the U generating unit 35 as the default value U_init (structure $U^0$).

In a situation wherein both of the structure $U^k$ and the point spread function $H^k$ have not been recognized accurately, in step S33, the structure $U^k$ is updated with the information of the newest point spread function $H^k$, and in step S34, the point spread function $H^k$ is updated with the information of the newest structure $U^k$.

According to this repetition, as the structure $U^k$ and the point spread function $H^k$ are updated alternately, the structure $U^k$ converges on a truer structure U, and the point spread function $H^k$ converges on a truer point spread function H, gradually.

Specifically, in step S33, the conv unit 27 through corr unit 31, U generating unit 35, total variation filter 37, and so forth use the default value H_init (=default estimated PSF) of the point spread function $H^k$ to execute updating of the structure $U^0$ by the Richardson-Lucy method according to the related art.

In step S33, the conv unit 27 executes convolution calculation between the point spread function $H^0$ that is the default value H_init of the point spread function $H^k$ from the H generating unit 26, and the structure $U^0$ from the U generating unit 35, and supplies a calculation result $H^0OU^0$ thereof to the processing unit 28.

The processing unit 28 subtracts from the input blurry image G the calculation result $H^0OU^0$ from the conv unit 27, and supplies a subtraction result $G-H^0OU^0$ thereof to the residual generating unit 29.

The residual generating unit 29 supplies the subtraction result $G-H^0OU^0$ from the processing unit 28 to the corr unit 30 and the corr unit 31.

The corr unit 30 executes correlation calculation between the subtraction result $G-H^0OU^0$ from the residual generating unit 29 and the point spread function $H^0$ from the H generating unit 26, and supplies a calculation result $H^0o(G-H^0OU^0)$ thereof to the multiplying unit 36.

The multiplying unit 36 multiplies the calculation result $H^0o(G-H^0OU^0)$ from the corr unit 30 by the structure $U^0$ from the U generating unit 35, and supplies the multiplication result $U^0\{H^0o(G-H^0OU^0)\}$ to the total variation filter 37 as the structure after updating.

The total variation filter 37 executes a process used for suppressing amplified noise and generated ringing, as the multiplication result $U^0\{H^0o(G-H^0OU^0)\}$ from the multiplying unit 36.

Subsequently, the total variation filter 37 supplies, of the structure component and the texture component of the multiplication result $U^o\{H^o o(G-H^O OU^o)\}$ obtained by the process thereof, the structure component to the U generating unit 35.

The U generating unit 35 obtains the structure component supplied from the total variation filter 37 as a structure $U^1$ that is a target to be updated of the next structure.

Subsequently, in order to further update the obtained structure $U^1$, the U generating unit 35 supplies the structure $U^1$ to the conv unit 27, corr unit 31, and multiplying unit 36.

In step S34, the H generating unit 26 through residual generating unit 29, corr unit 31, U generating unit 35, and so forth use the default value U_init of the structure $U^k$ to execute updating of the point spread function $H^0$ by the landweber method.

Note that, in the above-mentioned step S33, the residual generating unit 29 supplies the subtraction result $G-H^O OU^O$ from the processing unit 28 to the corr unit 30 and corr unit 31.

In step S34, the corr unit 31 executes correlation calculation between the subtraction result $G-H^O OU^O$ from the residual generating unit 29 and the structure $U^o$ from the U generating unit 35, and supplies a calculation result $U^o o(G-H^O OU^o)$ thereof to the subtracting unit 33. Also, the corr unit 31 supplies the point spread function $H^o$ from the H generating unit 26 via the conv unit 27, processing unit 28, and residual generating unit 29 to the averaging unit 32.

The averaging unit 32 calculates the average value mean($H^o$) of the point spread function $H^o$ from the corr unit 31, and supplies this to the subtracting unit 33. The subtracting unit 33 subtracts the mean($H^o$) from the averaging unit 32 from the calculation result $U^o o(G-H^O OU^o)$ supplied from the corr unit 31, and supplies a subtraction result $U^o o(G-H^O OU^o)-$mean($H^o$) obtained as a result thereof to the multiplying unit 23.

The multiplying unit 23 extracts, of the subtraction result $U^o o(G-H^O OU^o)-$mean($H^o$) from the subtracting unit 33, only the result corresponding to the subtraction result around the default estimated PSF based on the support limiting information from the support limiting unit 22, and supplies this to the adding unit 24.

The adding unit 24 multiplies the value $U^k o(G-H^k OU^k)$ of the values $U^k o(G-H^k OU^k)-$mean($H^k$) from the multiplying unit 23 by an undetermined multiplier $\lambda$. Subsequently, the adding unit 24 adds the point spread function $H^k$ from the H generating unit 26 to a value $\lambda U^k o(G-H^k OU^k)-$mean($H^k$) obtained as a result thereof, applies Lagrange's method for undetermined multipliers to the value $H^k+\lambda U^k o(G-H^k OU^k)-$mean($H^k$) obtained as a result thereof, thereby calculating a value a as the solution of the undetermined multiplier $\lambda$.

The adding unit 24 substitutes the value a calculated by the Lagrange's method for undetermined multipliers for the value $H^k+\lambda U^k o(G-H^k OU^k)-$mean($H^k$), and supplies a value $H^k+aU^k o(G-H^k OU^k)-$mean($H^k$) obtained as a result thereof to the center-of-gravity correcting unit 25.

Thus, $H^o+aU^o o(G-H^O OU^o)-$mean($H^o$)$=H^o+\Delta H^o$ obtained for multiple blocks each making up the blurry image is supplied to the center-of-gravity unit 25.

The center-of-gravity unit 25 moves the gravity of the point spread function $H^o+\Delta H^o$ to the center of the screen (the gravity of the default value H_init of the point spread function) by bilinear interpolation, and supplies the point spread function $H^o+\Delta H^o$ of which the gravity has been moved, to the H generating unit 26. The H generating unit 26 obtains the point spread function $H^o+\Delta H^o$ from the center-of-gravity unit 25 as the updated default spread function $H^1$.

Subsequently, in order to further update the obtained point spread function $H^1$, the H generating unit 26 supplies the point spread function $H^1$ to the adding unit 24, conv unit 27, and corr unit 30.

In step S35, determination is made whether to end the repetitive updating process. Specifically, for example, determination is made whether or not (at least either the structure $H^k$ or) the updated structure $U^k$ has converged. In the case that determination is made that the updated structure $U^k$ has not converged, the process returns to step S33.

Note that regarding whether or not the updated structure $U^k$ has converged is determined, for example, by the processing unit 28 based on whether or not the sum of squares $\Sigma|E^k|^2$ of the value $G-H^k OU^k(=E^k)$ corresponding to each of the blocks making up the blurry image is less than a predetermined value.

Alternatively, the total variation filter 37 may determine based on whether or not of the pixels making up the structure $U^k$ from the multiplying unit 36, total variation that represents the luminance difference absolute value sum between adjacent pixels is changed from increase to decrease.

In step S33, the updated point spread function $H^k$ (e.g., $H^1$) in the previous process in step S34 is used to execute updating of the updated structure $U^k$ (e.g., $U^1$) in the previous process in step S33 by the traditional Richardson-Lucy method.

Specifically, in step S33, the conv unit 27 through corr unit 31, U generating unit 35, total variation filter 37, and so forth use the updated point spread function $H^k$ (e.g., $H^1$) in the previous process in step S34 to execute updating of the structure $U^k$ (e.g., $U^1$) by the traditional Richardson-Lucy method.

Following end of the process in step S33, in step S34, the updated structure $U^k$ (e.g., $U^1$) in the previous process in step S33 is used to execute updating of the updated point spread function $H^k$ (e.g., $H^1$) in the previous process in step S34 by the landweber method.

That is to say, in step S34, the H generating unit 26 through residual generating unit 29, corr unit 31, U generating unit 35, and so forth use the updated structure $U^k$ (e.g., $U^1$) in the previous process in step S33 to execute updating of the updated point spread function $H^k$ (e.g., $H^1$) by the landweber method.

The process proceeds from step S34 to step S35, and thereafter, the same process will be repeated. Note that in the case that determination is made in step S35 that the updated structure $U^k$ has converged, the repetitive updating process is ended.

As described above, with the repetitive updating process, an arrangement has been made wherein updating of the structure $U^k$ and the point spread function $H^k$ is executed repeatedly, whereby the structure $U^k$ converges to the true structure U (and the point spread function $H^k$ converges to the true point spread function H), and accordingly, ringing and noise generated at the structure $U^k$ obtained finally can be suppressed.

Also, even from a state in which the PSF (=point spread function $H^o$) obtained as the default H_init is inaccurate, an accurate PSF, i.e., a true PSF, or a PSF approximated to a true PSF can be obtained.

Further, according to the support limiting of a PSF, the default value H_init (=default estimated PSF) is updated in the default estimated direction, whereby a true PSF or a PSF close to a true PSF can be obtained without divergence.

Note that, with the repetitive updating process, for example, an arrangement may be made wherein, in the case that estimation (generation) of the default value H_init (=point spread function $H^o$) has succeeded in step S31, in step S33 updating of the structure $U^o$ is executed with the default value H_init, and in the case that estimation (generation) of the default value H_init has failed in step S31, in step S33 the PSF is approximated by Gaussian, the approximated PSF is set as the default value H_init, thereby executing updating of the structure $U^0$. In this case, deterioration of the structure $U^0$ due to the shift of the default value H_init (=default estimated PSF) can be prevented.

Also, description has been made wherein, in step S33, the conv unit 27 through corr unit 31, U generating unit 35, total variation filter 37, and so forth execute updating of the structure $U^k$ by the traditional Richardson-Lucy method, but if the R-L high-speed algorithm wherein the process speed by the Richardson-Lucy method is increased is employed, the structure $U^k$ can be updated to a true structure U more rapidly.

Figure 10:
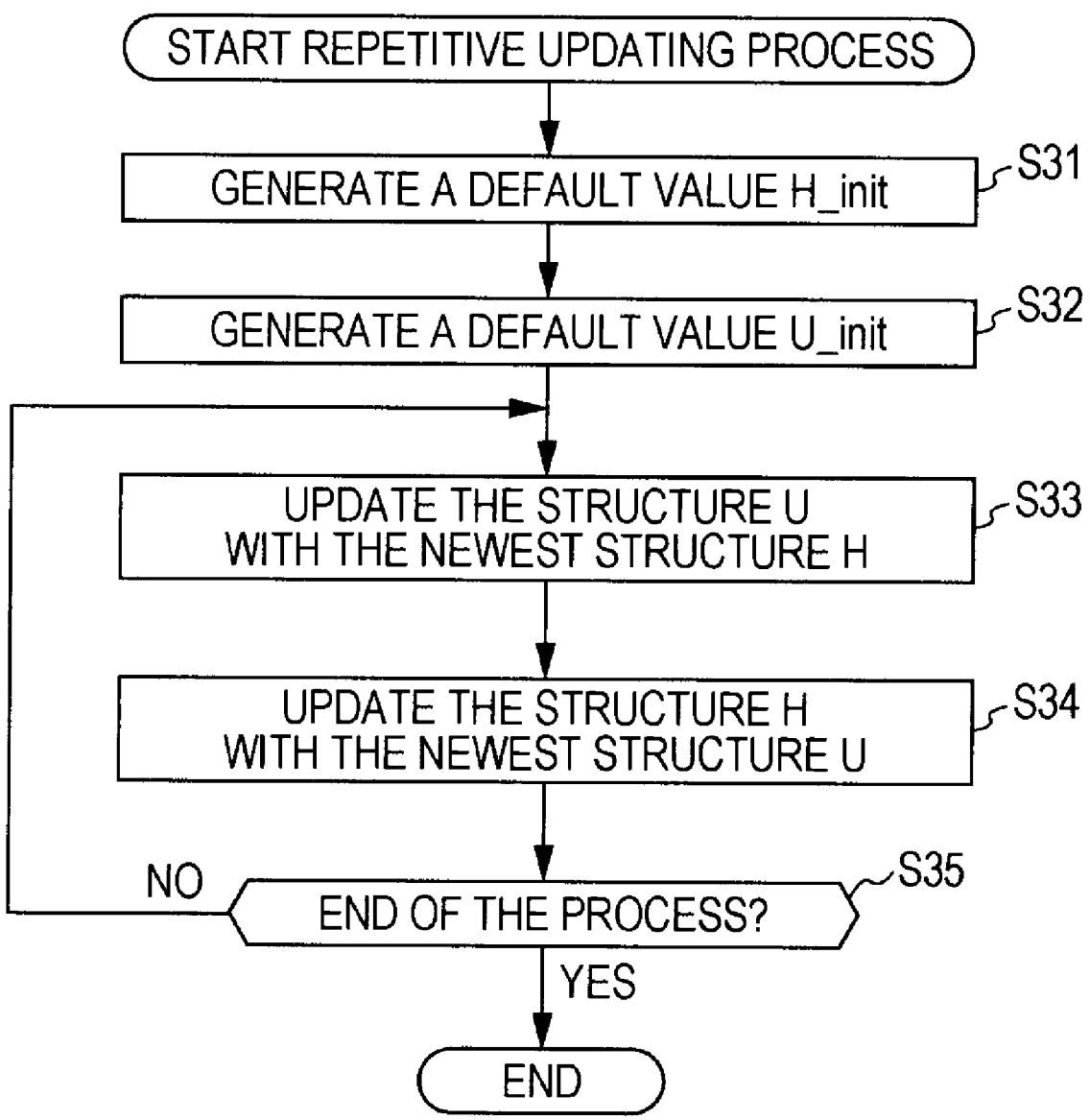
FIG. 10 is a flowchart describing a repetitive updating process.

Further, description has been made wherein, with the repetitive updating process in FIG. 10, in step S35, determination is made whether to end the repetitive updating process according to whether or not the updated structure $U^k$ has converged, but the present invention is not restricted to this.

Specifically, for example, an arrangement may be made wherein determination is made in step S35 whether or not the structure $U^k$ and the point spread function $H^k$ have been updated a predetermined number of times, and in the case that determination is made that updating has been made a predetermined number of times, the repetitive updating process is ended. Note that, as the predetermined number of times, for example, a number of times to some extent that ringing does not occur even with a low-precision PSF, or a number of times to some extent that ringing slightly generated by the total variation filter 37 can be canceled, is desirable.

Incidentally, with the first embodiment of the present invention, the structure $U^k$ with the filter threshold being reduced sufficiently has been taken as the final output, but the method according to the traditional residual deconvolution may be executed using a blurry image and the updated structure $U^k$.

Figure 11:
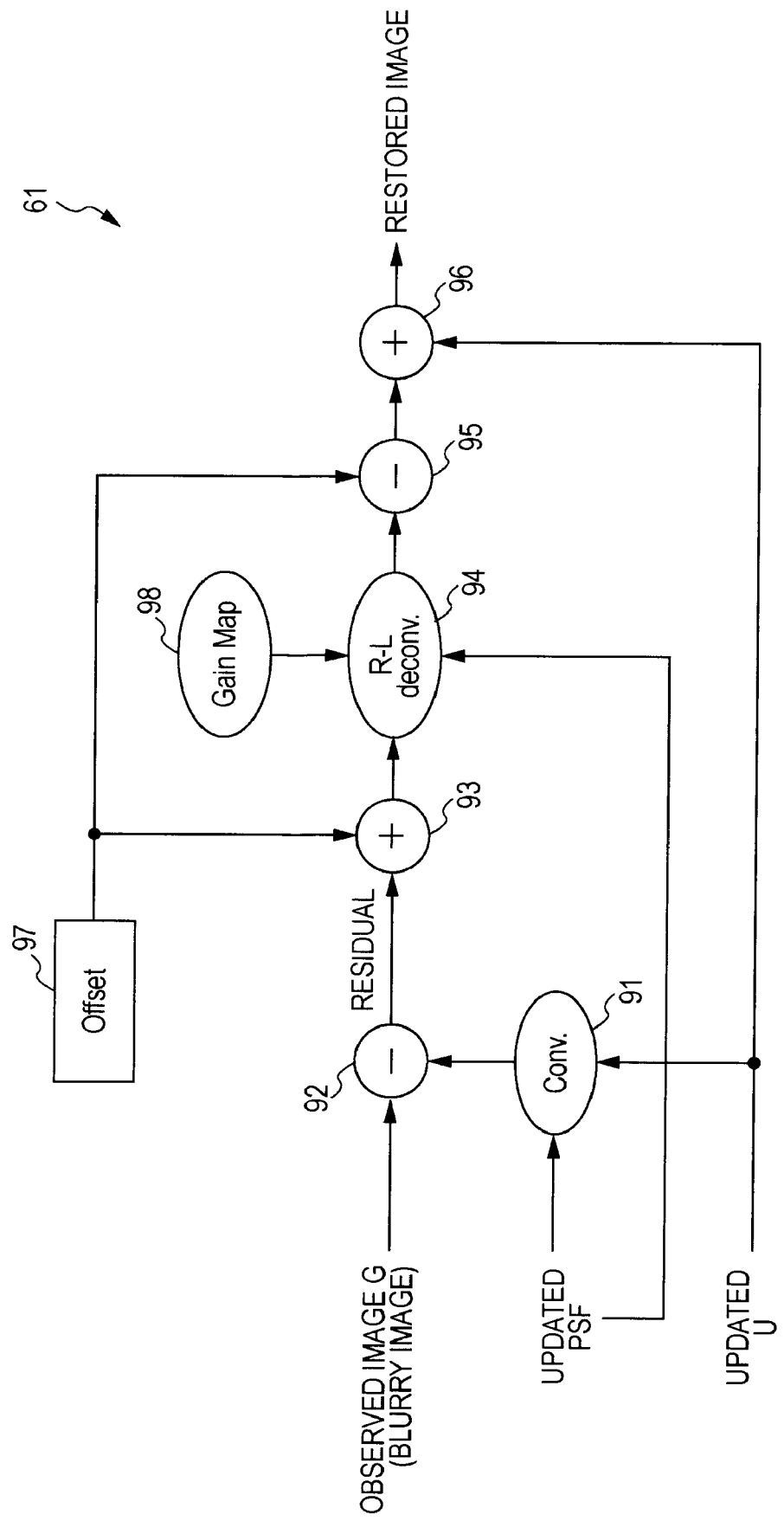
FIG. 11 is a block diagram illustrating a second configuration example of an information processing apparatus to which an embodiment of the present invention has been applied.

FIG. 11 illustrates a configuration example of an information processing apparatus 61 configured to execute the method according the traditional residual deconvolution using a blurry image and the updated structure $U^k$. This information processing apparatus 61 is configured of a conv unit 91, a subtracting unit 92, an adding unit 93, an R-Ldeconv unit 94, a subtracting unit 95, an adding unit 96, an offset unit 97, and a gain map (Gain Map) 98.

The updated $H^k$ and the updated $U^k$ are supplied to the conv unit 91. The conv unit 91 executes convolution calculation between the updated $H^k$ and the updated $U^k$, and supplies a value $H^k O U^k$ obtained as a result thereof to the subtracting unit 92.

The blurry image G is supplied to the subtracting unit 92. The subtracting unit 92 subtracts the value $H^k O U^k$ from the conv unit 91 from the supplied blurry image G, and supplies a subtraction result $G-H^k O U^k$ thereof to the adding unit 93 as a residual component.

In order to change the residual component $G-H^k O U^k$ from the subtracting unit 92 to a positive value, the adding unit 93 adds the offset value from the offset unit 97 to the residual component $G-H^k O U^k$, and supplies an addition result thereof to the R-Ldeconv unit 94. Note that the reason to add the offset value to the residual component $G-H^k O U^k$ to change the residual component $G-H^k O U^k$ to a positive value is in that a positive value is handled at the process by the R-Ldeconv unit 94.

The R-Ldeconv unit 94 executes the residual deconvolution described in Image Deblurring with Blurred/Noisy Image Pairs (Lu Yuan) as to the addition result from the adding unit 93 based on the gain map held in the gain map (Gain Map) unit 98, and the updated $H^k$. Thus, the residual component of ringing to which the offset value has been added is suppressed.

The subtracting unit 95 subtracts the same offset value as the offset value added at the adding unit 93 from the processing result from the R-Ldeconv unit 94, and obtains a residual component from which the ringing has been suppressed, i.e., a restoration result wherein the texture of the blurry image has been restored. Subsequently, the subtracting unit 95 supplies the restoration result of the obtained texture to the adding unit 96.

The updated structure $U^k$ is supplied to the adding unit 96. The adding unit 96 adds the texture restoration result from the subtracting unit 95, and the supplied updated structure $U^k$, and outputs a restored image obtained as a result thereof wherein blurring has been removed from the blurry image.

That is to say, for example, the adding unit 96 adds the texture restoration result and updated structure $U^k$, which correspond to a block making up the blurry image, and obtains a restored block wherein the blurring has been removed, from a block making up the blurry image, as the addition result thereof. Subsequently, the adding unit 96 obtains the restored block corresponding to each of the blocks making up the blurry image, and connects each of the restored blocks, thereby outputting a restored image.

The offset unit 97 holds the offset value to be added to change the residual component $G-H^k O U^k$ to a positive value beforehand. The offset unit 97 supplies the offset value held beforehand to the adding unit 93 and the subtracting unit 95. The gain map unit 98 holds the gain map to be used for adjusting the gain of the residual component $G-H^k O U^k$ beforehand.

As shown in FIG. 11, blurring is generated as to the updated structure $U^k$ by the updated point spread function PSF (point spread function $H^k$), deconvolution (process by the R-Ldeconv unit 94) is executed as to the residual component $G-H^k O U^k$ from the blurry image G, and adds an obtained result thereof (restoration result wherein the texture of the blurry image has been restored) to the updated structure $U^k$, whereby the detailed information of the residual is restored, and a fine restoration result is obtained.

Note that, with the first embodiment of the present invention, the repetitive updating process has been executed regarding RGB space (a blurry image made up of pixels represented with a R component, a G component, and a B component), but a similar repetitive updating process may be executed regarding other color space such as YUV space or the like.

Figure 12:
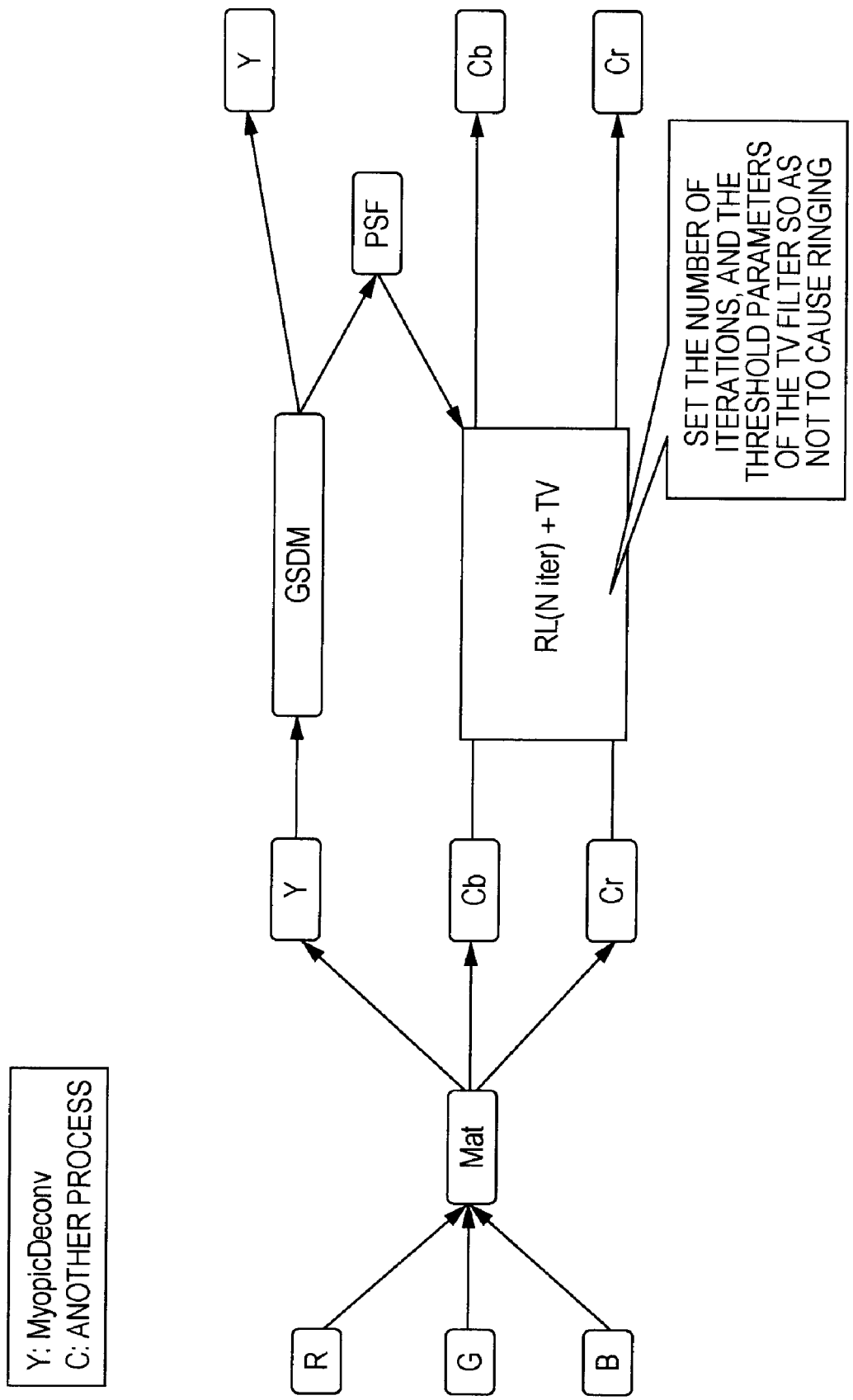
FIG. 12 is a diagram describing the repetitive updating process regarding YUV space.

FIG. 12 is a diagram describing that the repetitive updating process is executed regarding YUV space. As shown in FIG. 12, an arrangement may be made wherein, with YUV space, after the repetitive updating process (GSDM, Gradual Structure Deconvolution Method) is applied to Y alone to calculate an accurate PSF, a U/V component is subjected to a process by the Richardson-Lucy method or the like using the calculated accurate PSF to some extent that ringing does not occur, and adds this to Y.

Note that, with the above first embodiment, an arrangement has been made wherein the point spread function $H^k$ is updated using the landweber method, and also the structure $U^k$ is updated using the Richardson-Lucy method, but alternatively, for example, an arrangement may be made wherein the point spread function $H^k$ is updated using the Richardson-Lucy method, and also the structure $U^k$ is updated using the landweber method.

Next, description will be made regarding an information processing apparatus 121 which updates the point spread function $H^k$ using the Richardson-Lucy method, and also updates the structure $U^k$ using the landweber method, with reference to FIG. 13.

Figure 13:
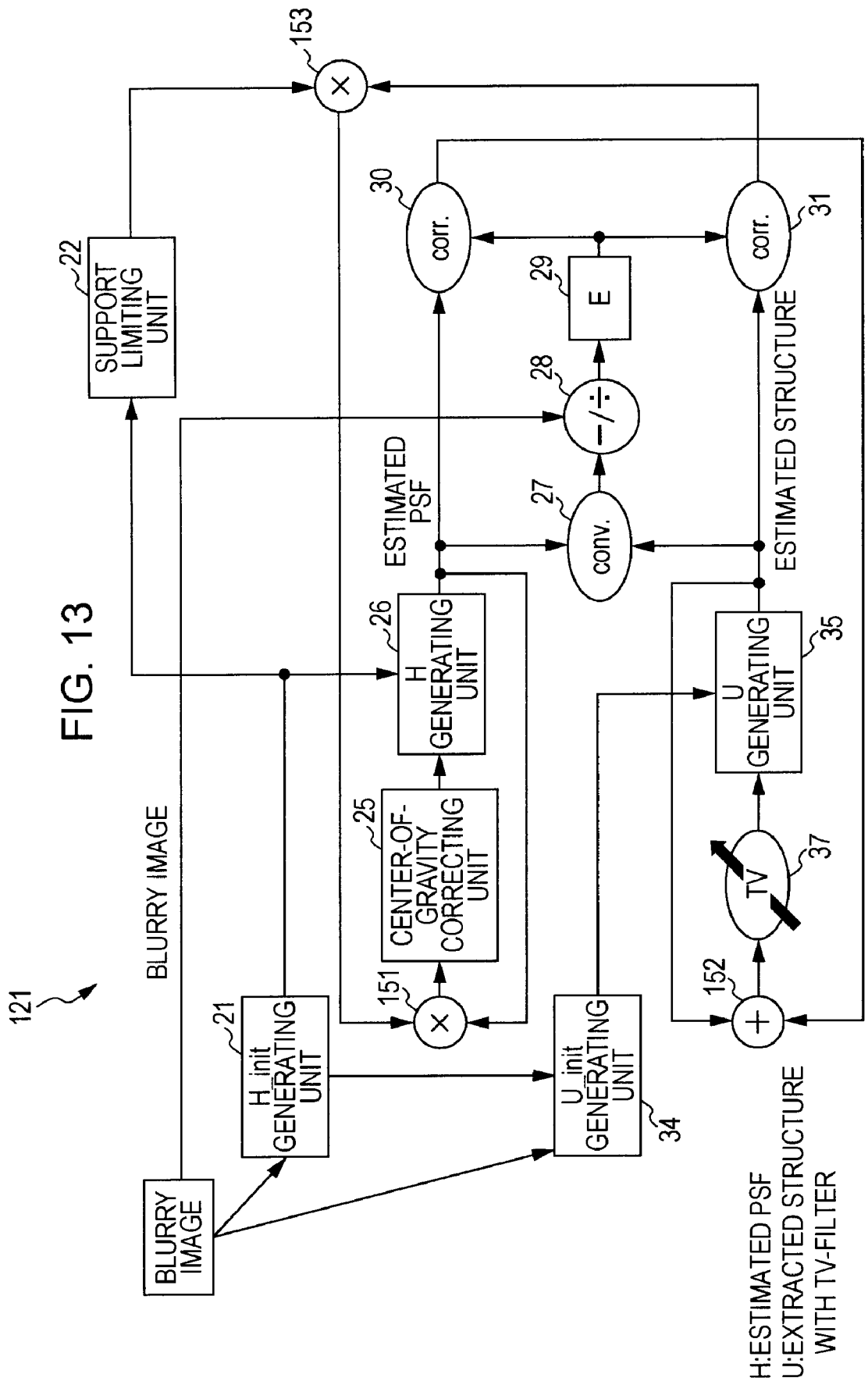
FIG. 13 is a block diagram illustrating a third configuration example of an information processing apparatus to which an embodiment of the present invention has been applied.

FIG. 13 illustrates the information processing apparatus 121 serving as a second embodiment of the present invention. Note that, with this information processing apparatus 121, of the components of the information processing apparatus 1 serving as the first embodiment shown in FIG. 1, the common components are denoted with the same reference numerals, and description thereof will be omitted as appropriate.

Specifically, the information processing apparatus 121 is configured in the same way as the information processing apparatus 1 in except that, with the information processing apparatus 121, a multiplying unit 151 instead of the adding unit 24, an adding unit 152 instead of the multiplying unit 36, and a multiplying unit 153 instead of the multiplying unit 23, averaging unit 32, and subtracting unit 33 are provided, respectively.

The calculation result $U^k o(G-H^k OU^k)$ corresponding to the region around the default estimated PSF is supplied from the multiplying unit 153 to the multiplying unit 151, and the point spread function $H^k$ is supplied from the H generating unit 26 to the multiplying unit 151, respectively.

The multiplying unit 151 multiplies the calculation result $U^k o(G-H^k OU^k)$ from the multiplying unit 153, and the point spread function $H^k$ from the H generating unit 26, and supplies a point spread function $H=H^k U^k o(G-H^k OU^k)$ obtained as a result thereof to the center-of-gravity unit 25. The calculation result $H^k o(G-H^k OU^k)$ is supplied from the corr unit 30 to the adding unit 152, and the structure $U^k$ is supplied from the U generating unit 35 to the adding unit 152, respectively.

The adding unit 152 adds the structure $U^k$ from the U generating unit 35 to a value $\lambda H^k o(G-H^k OU^k)$ obtained by multiplying the calculation result $H^k o(G-H^k OU^k)$ from the corr unit 30 by the undetermined multiplier $\lambda$. Subsequently, the adding unit 152 calculates the undetermined multiplier $\lambda$ regarding the addition result $U^k + \lambda H^k o(G-H^k OU^k)$ ($=U^{k+1}$) obtained as a result thereof by the Lagrange's method for undetermined multipliers.

The adding unit 152 substitutes a constant a calculated as the solution of the undetermined multiplier $\lambda$ for the addition result $U^k + \lambda H^k o(G-H^k OU^k)$, and supplies a structure $U^{k+1} = U^k + \lambda H^k o(G-H^k OU^k)$ obtained as a result thereof to the total variation filter 37.

The calculation result $U^k o(G-H^k OU^k)$ is supplied from the corr unit 31 to the multiplying unit 153, and the support limiting information is supplied from the support limiting unit 22 to the multiplying unit 153, respectively.

The multiplying unit 153 extracts, of the calculation result $U^k o (G-H^k OU^k)$ from the corr unit 31, only the calculation result corresponding to the region around the default estimated PSF based on the support limiting information from the support limiting unit 22, and supplies this to the adding unit 151.

With this information processing apparatus 121 as well, the same operation effects as with the information processing apparatus 1 serving as the first embodiment can be provided.

With the second embodiment, an arrangement has been made wherein the point spread function $H^k$ is updated using the Richardson-Lucy method, and also the structure $U^k$ is updated using the landweber method, but the point spread function $H^k$ and the structure $U^k$ may be updated using the Richardson-Lucy method, or the point spread function $H^k$ and the structure $U^k$ may be updated using the landweber method.

Note that, with the first and second embodiments, an arrangement has been made wherein the repetitive updating process is executed as to multiple blocks making up a blurry image, but the repetitive updating process may be executed with a blurry image itself as one block.

Note that, with the first and second embodiments, an arrangement has been made wherein a blurry image is subjected to the repetitive updating process, but the present invention is not restricted to this. Specifically, for example, a margin process may be executed wherein a blurry image is divided into multiple blocks, the information processing apparatus 1 serving as the first embodiment or the information processing apparatus 121 serving as the second embodiment is used to execute the repetitive updating process for each block, and as shown in FIG. 14 and FIG. 15, the multiple blocks following the repetitive updating process are connected, thereby generating a restored image after restoration.

Specifically, with the first and second embodiments, an arrangement has been made wherein a blurry image is divided into multiple blocks, and the repetitive updating process is executed for each block, but with a margin process, the divided blocks are enlarged (expanded), and then the repetitive updating process is executed, and multiple reduced blocks obtained by reducing the blocks after the repetitive updating process to the original block size are connected, thereby generating a restored image after restoration.

Figure 14:
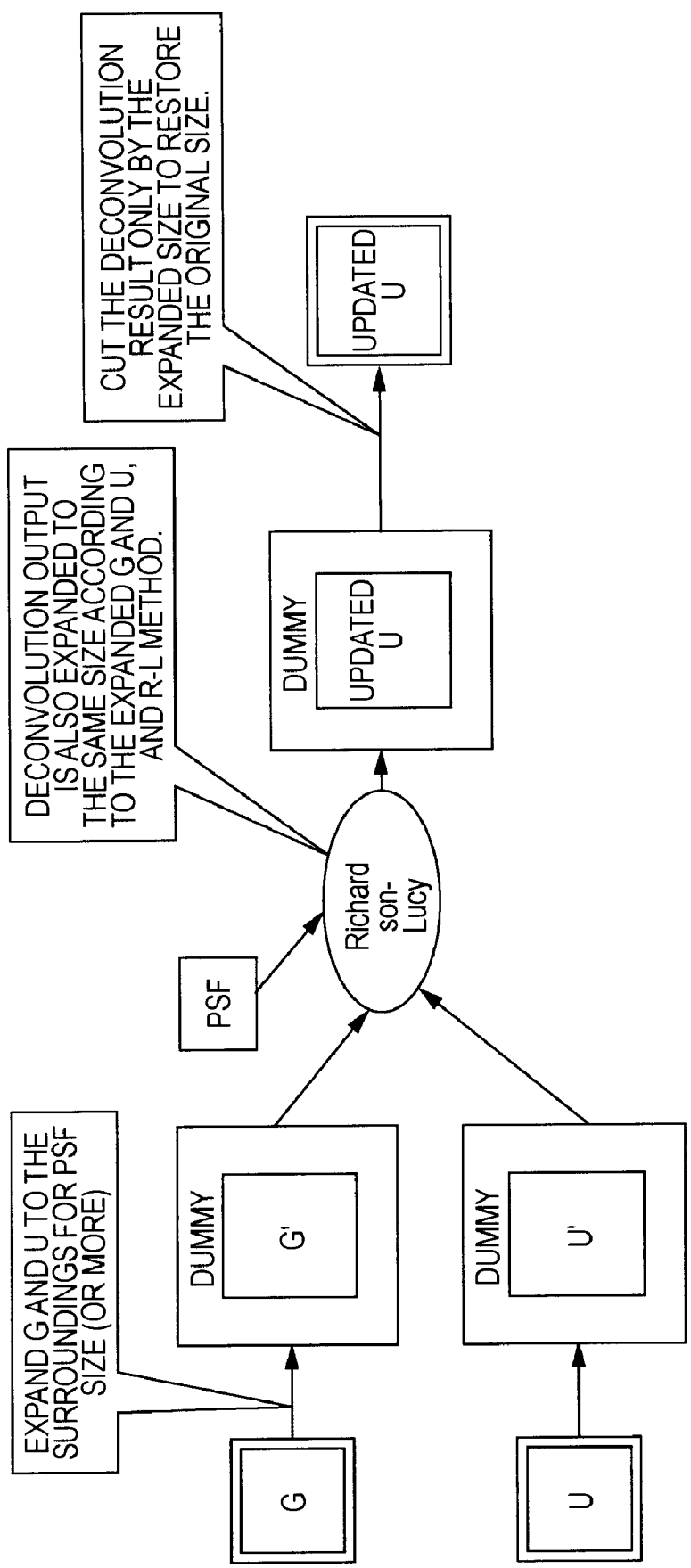
FIG. 14 is a first diagram describing a margin process.
Figure 15:
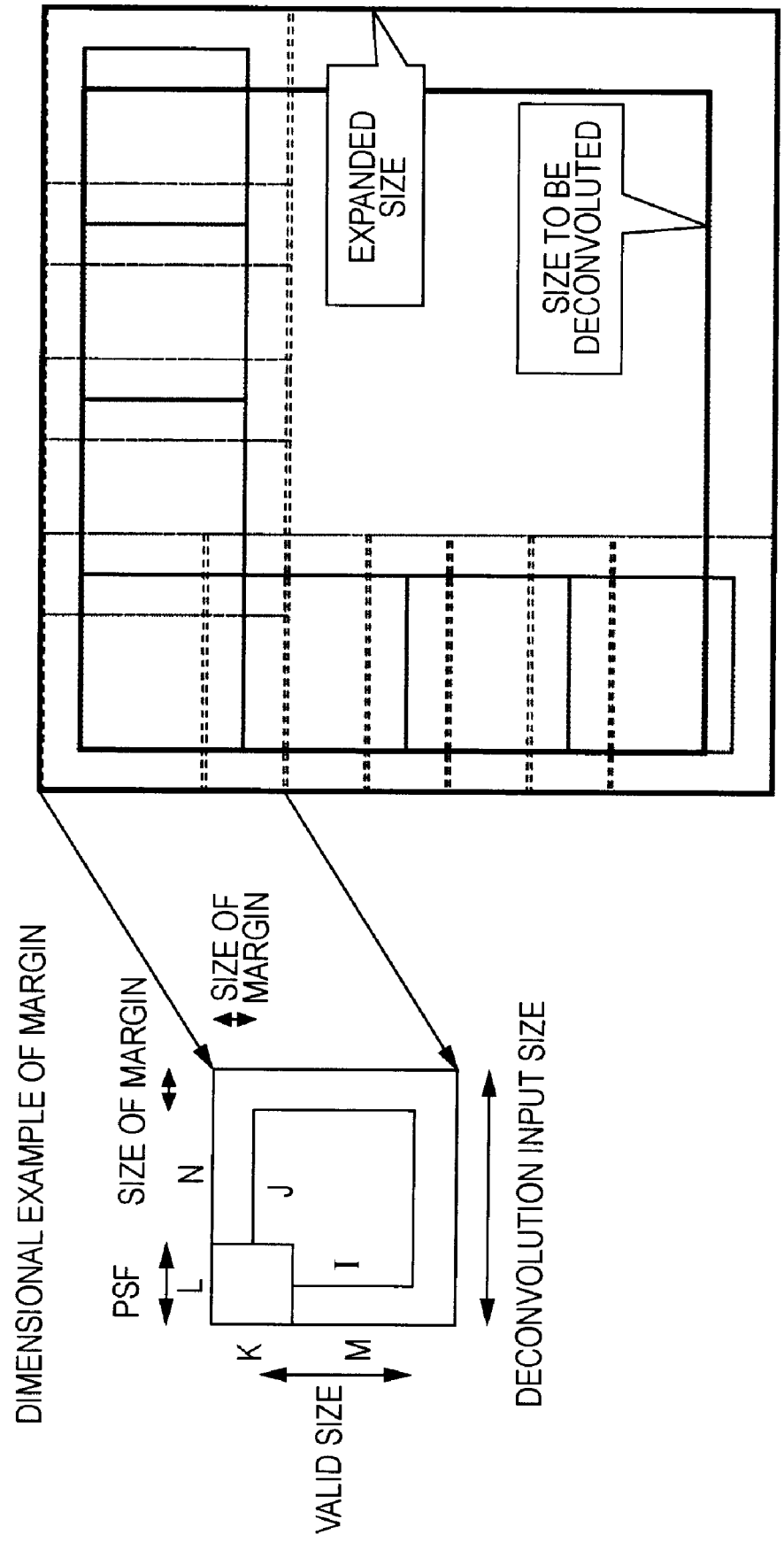
FIG. 15 is a second diagram describing the margin process.

FIG. 14 and FIG. 15 illustrate a situation of the margin process wherein multiple blocks after the repetitive updating process are connected, thereby generating a restored image after restoration.

Next, description will be made regarding a process to generate the structure $U^k$ corresponding to each of multiple blocks making up a blurry image, with reference to FIG. 14. As shown in FIG. 14, each of the multiple blocks making up the blurry image (e.g., G shown in FIG. 14) is enlarged (expanded) to maintain continuity between adjacent blocks such that the adjacent blocks have a size whereby both are overlapped partially. Thus, an enlarged block (e.g., G' to which dummy is appended shown in FIG. 14) is generated.

Also, the structure $U^0$ corresponding to each of the blocks making up the blurry image (e.g., U shown in FIG. 14) is also enlarged with the same size. Thus, an enlarged structure (e.g., U' to which dummy is appended shown in FIG. 14) is generated.

Subsequently, updating of an enlarged structure is executed by the Richardson-Lucy method based on the enlarged blocks, enlarged structures, and the point spread function $H^0$ generated based on the enlarged blocks (e.g., PSF shown in FIG. 14). The enlarged structure after updating obtained by updating of an enlarged structure by the Richardson-Lucy method (e.g., updated U to which dummy has been appended, shown in FIG. 14) is reduced to the size of the original structure $U^0$.

Thus, as a structure corresponding to each of the multiple blocks making up the blurry image, a structure wherein continuity between adjacent blocks is maintained (e.g., updated U shown in FIG. 14) is obtained, and as shown in FIG. 15, the obtained structures are connected, whereby a restored image of which the blurring has been reduced (removed) can be obtained.

Also, an arrangement may be made wherein, with one enlarged block, updating of the point spread function $H^k$ is executed, the point spread function obtained finally is used as the point spread function of another enlarged block to update the structure $U^k$ corresponding to the other enlarged block. In this case, with the other enlarged block, updating of the structure $U^k$ alone should be executed, and updating of the point spread function $H^k$ does not have to be executed.

Therefore, (the storage capacity of) memory used for calculating the point spread function H of each enlarged block can be reduced as compared to the case of executing updating of the corresponding point spread function $H^k$ for each enlarged block, and also calculation amount used for updating (calculating) the point spread function can be reduced.

Also, with the first embodiment, an arrangement has been made wherein the blurry image is divided into multiple blocks, the point spread function $H^k$ and the structure $U^k$ are updated repeatedly for each block, but an arrangement may be made wherein updating of the point spread function $H^k$ is executed regarding a predetermined block alone of the multiple blocks, and the point spread function obtained finally is used as the point spread function for another block, whereby memory used for calculating the point spread function $H^k$ of each block can be reduced, and also calculation amount used for updating (calculating) the point spread function can be reduced.

Incidentally, with the repetitive updating process, an arrangement has been made wherein the process is executed on a blurry image, but in addition to this, this process may be executed as to a blurring image where defocusing due to focal length shift, in-plane uniform blurring, in-plane nonuniform surrounding blurring, or the like has occurred.

Also, with the repetitive updating process, the process may be executed as to a moving image recorded beforehand in which blurring has occurred, and also the process may be executed so as to detect blurring generated at the time of imaging a moving image to remove this in real time.

With the first embodiment in FIG. 1, an arrangement has been made wherein, in order to separate the structure component and the texture component, and accordingly, the total variation filter 37 is used, but in addition to this, for example, a bilateral filter, $\epsilon$ filter, or the like may be employed.

With the first and second embodiments, an arrangement has been made wherein the processing unit 28 subtracts the calculation result $H^k O U^k$ from the conv unit 27 from the blurry image G, and supplies the subtraction result thereof $G - H^k O U^k$ thereof to the residual generating unit 29, but alternatively, the same results can be obtained even with an arrangement wherein the blurry image G is divided by the calculation result $H^k O U^k$ from the conv unit 27, and the subtraction result $(H^k O U^k)/G$ thereof is supplied to the residual generating unit 29.

With the above repetitive updating process, an arrangement has been made wherein in step S33, the point spread function $H^k$ is used to execute updating of the structure $U^k$, and simultaneous therewith, in step S34, the structure $U^k$ is used to execute updating of the point spread function $H^k$, but the present invention is not restricted to this. That is to say, for example, with the repetitive updating process, updating of the structure, and updating of the point spread may be executed alternately.

Specifically, for example, an arrangement may be made wherein in step S33 the point spread function $H^k$ is used to execute updating of the structure $U^k$, and in step S34 the structure $U^{k+1}$ obtained by the updating thereof is used to execute updating of the point spread function $H^k$. Further, in the next step S33 the point spread function $H^{k+1}$ obtained by the updating is used to execute updating of the structure $U^{k+1}$, and in the next step S34 the structure $U^{k+2}$ obtained by the updating is used to execute updating of the point spread function $H^{k+1}$, whereby updating of the structure and the point spread function can be executed alternately.

In this case, for example, as compared to the case of using the structure $U^k$ to execute the point spread function $H^k$, the structure $U^{k+1}$ approximated to a truer structure is used to execute the point spread function $H^k$, whereby the point spread function $H^{k+1}$ approximated to a truer point of spread function can be obtained as the updating result of the point spread function $H^k$.

Also, the information processing apparatus 1 serving as the first embodiment, and the information processing apparatus 121 serving as the second embodiment may be applied to, for example, a recording/reproducing apparatus whereby an image can be reproduced or recorded, or the like.

Incidentally, the above-mentioned series of processes can be executed by hardware, and can also be executed by software. In a case of executing the series of processing by software, a program making up the software thereof is installed from a program storage medium to a so-called built-in computer, or a general-purpose personal computer capable of executing various types of functions by various types of programs being installed, or the like.

Figure 16:
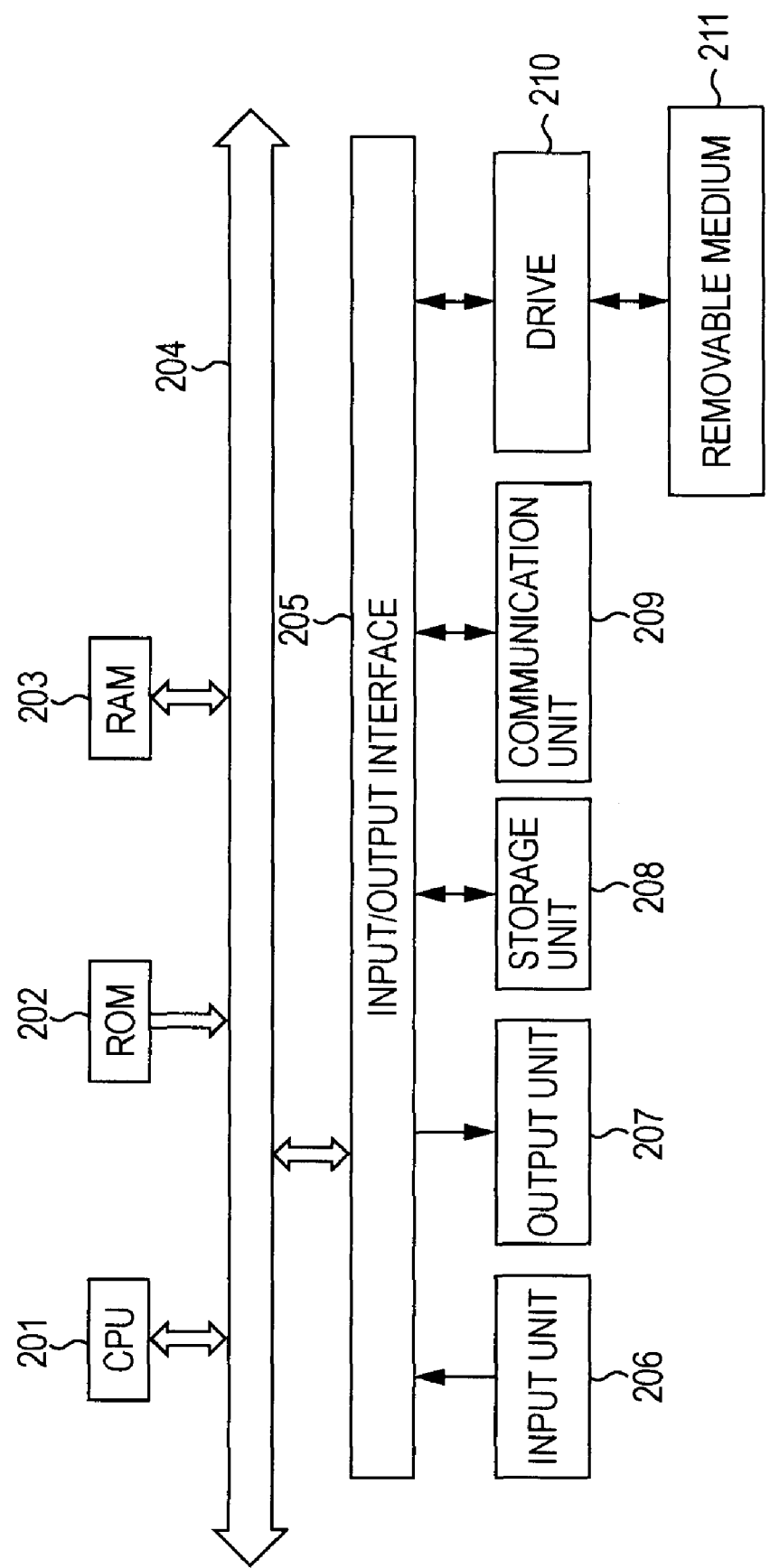
FIG. 16 is block diagram illustrating a configuration example of a computer.

FIG. 16 illustrates a configuration example of a computer which executes the above-mentioned series of processes by the program. A CPU (Central Processing Unit) 201 executes various types of processes in accordance with the program stored in ROM (Read Only Memory) 202 or a storage unit 208. A program that the CPU 201 executes, data, and so forth are stored in RAM (Random Access Memory) 203 as appropriate. The CPU 201, ROM 202, and RAM 203 are connected mutually by a bus 204.

An input/output interface 205 is also connected to the CPU 201 via the bus 204. An input unit 206 made up of a keyboard, mouse, microphone, and so forth, and an output unit 207 made up of a display, speaker, and so forth, are connected to the input/output interface 205. The CPU 201 executes various types of process in accordance with a command input from the input unit 206. Subsequently, the CPU 201 outputs a process result to the output unit 207.

The storage unit 208 connected to the input/output interface 205 is made up of, for example, a hard disk, and stores a program that the CPU 201 executes, and various types of data. A communication unit 209 communicates with an external apparatus via a network such as the Internet, a local area network, or the like.

Also, a program may be obtained via the communication unit 209 to store this in the storage unit 208.

When a removable medium 211, such as a magnetic disk, an optical disc, a magneto-optical disk, semiconductor memory, or the like, is mounted, a drive 210 connected to the input/output interface 205 drives this to obtain a program or data or the like recorded therein. The obtained program and data are transferred to the storage unit 208 and stored therein as appropriate.

A program storage medium which stores a program that is installed into a computer, and is turned into an executable state by the computer is, as shown in FIG. 16, configured of a removable medium 211 which is a package medium made up of a magnetic disk (including a flexible disk), optical disc (including CD-ROM (Compact Disc-Read Only Memory), DVD (Digital Versatile Disc)), magneto-optical disc (including MD (Mini-Disc)), semiconductor memory, or the like, or the ROM 202 in which a program is temporarily or eternally stored, and a hard disk making up the storage unit 208, and so forth. Storing of a program in the program storage medium is executed via the communication unit 209 which is an interface as to a router or modem or the like, using a cable or wireless communication medium such as a local area network, the Internet, or digital satellite broadcasting, as appropriate.

Note that, with the present Specification, steps that describe a program to be stored in the program storage medium include not only processes performed in time sequence in accordance with the described sequence but also processes not necessarily performed in time sequence but performed in parallel or individually.

Also, the embodiments of the present invention are not restricted to the above-mentioned embodiment, and various modifications can be performed without departing from the essence of the present invention.

The present application contains subject matter related to that disclosed in Japanese Priority Patent Application JP 2008-218011 filed in the Japan Patent Office on Aug. 27, 2008, and Japanese Priority Patent Application JP 2009-139206 filed in the Japan Patent Office on Jun. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
first generating means configured to generate, based on feature points detected on a cepstrum from an input image, a point spread function that represents the degree of blurring generated in said input image;
second generating means configured to generate a structure that represents an image obtained by reducing said input image with a size based on said point spread function and enlarging said input image with said size, based on said point spread function; and
updating means configured to execute an updating process to update at least either said point spread function or said structure such that said point spread function and said structure approximate to a true value;
wherein said updating means repeatedly execute said updating process to set, of a structure component and a texture component making up said structure after updating by said updating process, said structure component as a new structure to be updated by said updating process, and set said point spread function after updating by said updating process as a new target to be updated by said updating process.

2. The information processing apparatus according to claim 1, wherein said updating means repeatedly execute said updating process to set said point spread function and said structure as a target to be updated.

3. The information processing apparatus according to claim 1, wherein said updating means repeatedly execute said updating process to set said point spread function and said structure as a target to be updated alternately.

4. The information processing apparatus according to claim 1, wherein said updating means update at least one of said point spread function and said structure by the landweber method or the Richard-Lucy method.

5. The information processing apparatus according to claim 1, wherein said updating means separate said structure after updating by said updating process into said structure component and said texture component based on a filter threshold used for separating said structure after updating by said updating process into said structure component and said texture component, and set said structure component after separation as a new structure to be updated by said updating process.

6. The information processing apparatus according to claim 1, wherein said updating means set a filter threshold to some extent that said structure is updated, and separate said structure component and said texture component.

7. The information processing apparatus according to claim 1, wherein said updating means end said updating process in the case that a total variation has been changed from increase to decrease, or in the case that the absolute value of a difference obtained by subtracting calculation results by convolution calculation between said point spread function and said texture from said input image is equal to or smaller than a predetermined threshold.

8. The information processing apparatus according to claim 1, wherein said first generating means divide said input image into a plurality of blocks to generate said point spread function for said divided blocks each;
and wherein said second generating means generate a structure from a block obtained by reducing and then enlarging said block.

9. The information processing apparatus according to claim 8, wherein said first generating means generate said point spread function corresponding to a predetermined block of a plurality of blocks making up said input image;
and wherein said updating means update said point spread function generated by said first generating means repeatedly.

10. The information processing apparatus according to claim 9, wherein said updating means set said point spread function finally obtained by updating said point spread function repeatedly as a point spread function corresponding to a block different from said predetermined block of a plurality of blocks;
and wherein said updating means use a point spread function corresponding to a block different from said predetermined block to update said structure regarding each block different said predetermined block repeatedly.

11. The information processing apparatus according to claim 1, further comprising:
convolution calculating means configured to execute convolution calculation between the updated point spread function and the updated structure finally obtained according to said updating process by said updating means;
subtracting means configured to subtract a convolution calculation result obtained by said convolution calculation from said input image;
restoring means configured to restore the texture of said input image based on the subtraction result by said subtracting means; and
restored image generating means configured to generate a restored image from which blurring generated in said input image based on a structure finally obtained and said texture restored.

12. An information processing method for an information processing apparatus configured to correct an input image, said information processing apparatus including
first generating means,
second generating means, and
updating means,
said method comprising the steps of:
using said first generating means to generate a point spread function that represents the degree of blurring generated in said input image, based on feature points detected on a cepstrum from an input image;
using said second generating means to generate a structure that represents an image obtained by reducing said input image with a size based on said point spread function, and enlarging said input image with said size, based on said point spread function; and
using said updating means to execute an updating process to update at least either said point spread function or said structure such that said point spread function and said structure approximate to a true value;

wherein said updating means repeatedly execute said updating process to set, of a structure component and a texture component making up said structure after updating by said updating process, said structure component as a new structure to be updated by said updating process, and set said point spread function after updating by said updating process as a new target to be updated by said updating process.

13. A program causing a computer to serve as:

first generating means configured to generate, based on feature points detected on a cepstrum from an input image, a point spread function that represents the degree of blurring generated in said input image;

second generating means configured to generate a structure that represents an image obtained by reducing said input image with a size based on said point spread function, and enlarging said input image with said size, based on said point spread function;

updating means configured to execute an updating process to update at least either said point spread function or said structure such that said point spread function and said structure approximate to a true value;

wherein said updating means repeatedly execute said updating process to set, of a structure component and a texture component making up said structure after updating by said updating process, said structure component as a new structure to be updated by said updating process, and set said point spread function after updating by said updating process as a new target to be updated by said updating process.

14. An information processing apparatus comprising:

a first generating unit configured to generate, based on feature points detected on a cepstrum from an input image, a point spread function that represents the degree of blurring generated in said input image;

a second generating unit configured to generate a structure that represents an image obtained by reducing said input image with a size based on said point spread function and enlarging said image with said size, based on said point spread function; and an updating unit configured to execute an updating process to update at least either said point spread function or said structure such that said point spread function and said structure approximate to a true value;

wherein said updating unit repeatedly executes said updating process to set, of a structure component and a texture component making up said structure after updating by said updating process, said structure component as a new structure to be updated by said updating process, and set said point spread function after updating by said updating process as a new target to be updated by said updating process.

15. An information processing method for an information processing apparatus configured to correct an input image, said information processing apparatus including a first generating unit, a second generating unit, and an updating unit, said method comprising the steps of:

using said first generating unit to generate a point spread function that represents the degree of blurring generated in said input image, based on feature points detected on a cepstrum from an input image;

using said second generating unit to generate a structure that represents an image obtained by reducing said input image with a size based on said point spread function, and enlarging said input image with said size, based on said point spread function; and using said updating unit to execute an updating process to update at least either said point spread function or said structure such that said point spread function and said structure approximate to a true value;

wherein said updating unit repeatedly executes said updating process to set, of a structure component and a texture component making up said structure after updating by said updating process, said structure component as a new structure to be updated by said updating process, and set said point spread function after updating by said updating process as a new target to be updated by said updating process.

16. A computer program embodied in a non-transitory computer medium causing a computer to serve as:

a first generating unit configured to generate, based on feature points detected on a cepstrum from an input image, a point spread function that represents the degree of blurring generated in said input image;

a second generating unit configured to generate a structure that represents an image obtained by reducing said input image with a size based on said point spread function, and enlarging said input image with said size, based on said point spread function;

an updating unit configured to execute an updating process to update at least either said point spread function or said structure such that said point spread function and said structure approximate to a true value;

wherein said updating unit repeatedly executes said updating process to set, of a structure component and a texture component making up said structure after updating by said updating process, said structure component as a new structure to be updated by said updating process, and set said point spread function after updating by said updating process as a new target to be updated by said updating process.

* * * * *